US006429802B1

(12) United States Patent
Roberts

(10) Patent No.: US 6,429,802 B1
(45) Date of Patent: Aug. 6, 2002

(54) DETERMINING THE CONDITION OF A CONCRETE STRUCTURE USING ELECTROMAGNETIC SIGNALS

(75) Inventor: Roger L. Roberts, Amesbury, MA (US)

(73) Assignee: Geophysical Survey Systems, North Salem, NH (US)

(*) Notice: Subject to any disclaimer, the term of this patent is extended or adjusted under 35 U.S.C. 154(b) by 0 days.

(21) Appl. No.: 09/457,749

(22) Filed: Dec. 8, 1999

Related U.S. Application Data

(60) Provisional application No. 60/111,421, filed on Dec. 8, 1998.

(51) Int. Cl.[7] ........................... G01S 13/88; G01S 13/00
(52) U.S. Cl. ........................... 342/22; 342/27; 342/175; 342/195
(58) Field of Search ........................... 342/21, 22, 25, 342/118, 127, 134–136, 175, 176, 179, 188–197, 59, 27, 28

(56) References Cited

U.S. PATENT DOCUMENTS

| | | | | |
|---|---|---|---|---|
| 3,665,466 | A | * 5/1972 | Hibbard | 342/59 |
| 4,698,634 | A | * 10/1987 | Alongi et al. | 342/22 |
| 4,837,509 | A | 6/1989 | Dodmann et al. | |
| 5,384,715 | A | 1/1995 | Lytton | |
| 5,420,589 | A | * 5/1995 | Wells et al. | 342/22 |
| 5,748,003 | A | 5/1998 | Zoughi et al. | |
| 5,835,053 | A | 11/1998 | Davis | |
| 5,835,054 | A | * 11/1998 | Warhus et al. | 342/22 |
| 5,905,455 | A | 5/1999 | Heger et al. | |
| 5,939,889 | A | 8/1999 | Zoughi et al. | |
| 5,952,561 | A | 9/1999 | Jaselskis et al. | |
| 6,029,521 | A | 2/2000 | Lin et al. | |
| 6,198,293 | B1 | 3/2001 | Woskov et al. | |

OTHER PUBLICATIONS

R. Zoughi, G. L. Cone, and P.S. Nowak, "Microwave Nondestructive Detection of Rebars in Concrete Slabs," NDT Solution, 1991, The American Society for Nondestructive Training, Inc.

* cited by examiner

*Primary Examiner*—Bernarr E. Gregory
(74) *Attorney, Agent, or Firm*—Wolf, Greenfield & Sacks, P.C.

(57) ABSTRACT

Ground penetrating radar (GPR) is a technique that may be used to image the inside of a structure by collecting the echoes (or reflections) resulting from electromagnetic signals such as, for example, electromagnetic waves of typically high frequency, being radiated into the structure. Typically, the rebars inside of a reinforced concrete structure are strong radar wave reflectors. Locating deteriorated areas within a reinforced concrete structure may be accomplished by analyzing the reflections, particularly the amplitudes of the reflections, from the rebars in the reinforced concrete structure. Furthermore, the extent of deterioration of these located areas may be determined from such analysis. Significantly, the system and method described herein, when applied to determine the extent of deterioration of one or more areas of a reinforced concrete bridge deck, is effective even if a layer of asphalt is laminated to the surface of the reinforced bridge deck. A method and system for determining a condition of a substantially concrete structure is provided. One or more computer-readable data signals is received, where each data signal represents an electromagnetic signal detected from an area of the concrete structure. One or more of the detected electromagnetic signals include electromagnetic energy reflected from the concrete structure as a result of an electromagnetic signal transmitted into the concrete structure. An extent of deterioration of one or more areas of the substantially concrete structure are determined from the one or more computer-readable data signals.

66 Claims, 15 Drawing Sheets

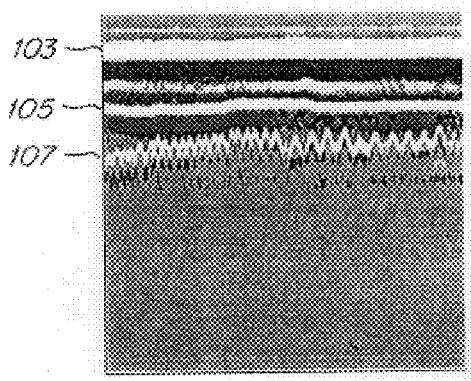 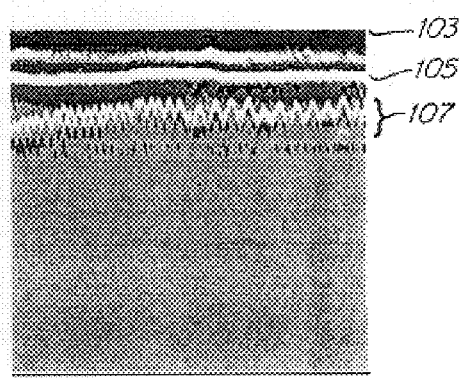
*FIG. 10A*  *FIG. 10B*
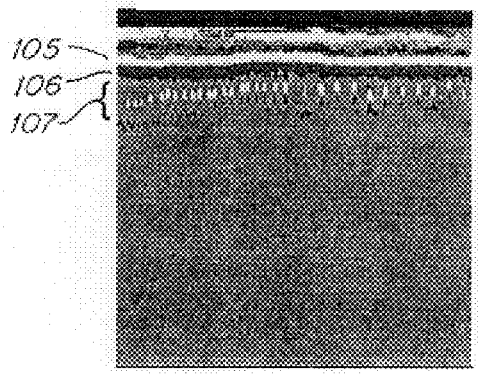 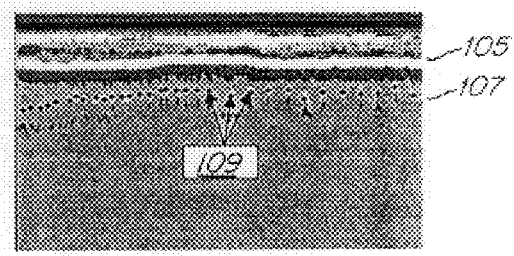
*FIG. 10C*  *FIG. 10D*

DETERMINING THE CONDITION OF A CONCRETE STRUCTURE USING ELECTROMAGNETIC SIGNALS

This application claims priority to U.S. provisional application Ser. No. 60/111,421, filed Dec. 8, 1998, entitled BRIDGE DECK CONDITION ASSESSMENT USING GPR REBAR REFLECTION ANALYSIS, and now abandoned.

FIELD OF INVENTION

This invention relates to determining the condition of an inhomogeneous structure. More particularly, this invention relates to a system and method for accurately locating deteriorated portions of a reinforced concrete structure such as, for example, a bridge deck, using electromagnetic signals.

BACKGROUND OF INVENTION

A bridge deck is the portion of a bridge upon which traffic travels. The life expectancy of a bridge deck (the period of time during which the structural integrity of the bridge deck is sufficient to safely support the traffic load for which it was intended) is typically one-half of the expected life span of the entire bridge. Consequently, during the life span of a typical bridge, its deck surface is replaced at least once.

Bridge decks are typically made of reinforced concrete. As referred to herein, concrete is a mixture of fine and coarse aggregates such as, for example, crushed stone or gravel, firmly bound into a monolithic mass by a cementing agent such as, for example, Portland cement. Reinforced concrete as referred to herein is concrete in which metal rods or bars, preferably made of steel, are incorporated into the concrete in such a manner as to reinforce or strengthen the more or less brittle nature of concrete. Such rods or bars carry the tension to which a concrete structure may be subjected, thus reinforcing the concrete, and are referred to herein as reinforcing bars or rebars. As used herein, a substantially concrete structure is a structure where the primary constituent is concrete. Such a substantially concrete structure may contain reinforcing bars to improve tensile strength, a waterproofing membrane to protect the structure from moisture, an asphalt layer or overlay, other added elements to improve durability or performance, and possible inadvertently added elements.

The short life expectancy of a typical bridge deck relative to the entire bridge structure is due in part to the intense loading cycles from vehicular traffic to which the bridge deck is subjected. Further, a bridge deck may be subjected to extreme climates such as, for example, snow, ice, and thermal freeze-thaw cycles. Further, such extreme climates, and human intervention to permit the flow of traffic on the bridge amidst these harsh conditions, may result in the ingress of road salt. These factors may lead to the eventual deterioration of portions of the bridge deck, making travel on the bridge unsafe. Thus, for safety reasons, the inspection and analysis of the condition of a bridge deck is a continual process, with inspections becoming increasingly important as the bridge deck grows older.

As used herein, deterioration refers to any physical change in a concrete or other comparable structure resulting in a loss of structural integrity of the concrete structure. Many forms of deterioration result from moisture present in the concrete, which may be caused by freeze-thaw cycles, intense loading cycles, the ingress of road salt, and severe weather, as discussed above. In a reinforced concrete bridge deck (or reinforced deck), such moisture may cause one or more rebars to corrode. Signs of deterioration visible from the exterior of a concrete bridge deck include concrete cracking, staining, disintegration, and delamination. Cracking may occur, for example, where the concrete becomes too dry and brittle. Staining may occur where the deterioration of a portion of concrete causes a discoloring of the portion of concrete. Disintegration may occur where the deterioration of a portion of the concrete results in the loss of structural integrity of the portion, either removing the portion of the concrete entirely from the concrete structure or reducing the portion to individual particles. Delamination is the peeling away of a layer of concrete from the remainder of a concrete structure such as, for example, when a layer of concrete pulls away from a layer of rebar.

As discussed above, concrete structures, including concrete bridge decks, typically are reinforced with rebars to provide tensile strength to the concrete structure. Although deterioration results from moisture, chemical activity and the corrosion of rebars, such deterioration may not lead to any externally visible signs of deterioration, and this potentially dangerous situation may go unnoticed.

One known method of determining the structural integrity of a concrete bridge deck is to visually inspect portions of the surface of the concrete structure to determine the presence of any externally visible signs of deterioration, such as those discussed above. The internal condition of the portion is then inferred from the visual inspection. Although visual inspection may detect some of the areas of deterioration present within a reinforced concrete bridge deck, visual inspection often does not detect internal deterioration such as, for example, the corrosion of rebars, that do not manifest themselves on the exterior of the bridge deck.

Other known methods such as, for example, the "chain drag" and "hammer sounding" technique involve listening to sounds reflected from portions of a bridge to determine the structural integrity the portion. Using the chain drag technique, a chain is dragged across sections of the surface of a bridge deck. For the hammer sounding technique, sound is generated by banging a hammer at different sections of the surface of the bridge deck. In either technique, by listening to the reflection of the resulting sound from the bridge deck and/or the transmission of sound through the deck, the presence of deterioration may be determined. Typically, the presence of deterioration is assumed detected if the sound is more "hollow" than that from a bridge deck in good condition. Both of these sound methods are prone to inaccuracy as it is difficult to determine from reflected sound a detailed, localized picture of the structural integrity of a concrete structure.

Yet another sound technique is the "impact echo" technique. For this technique, an acoustic source transmits acoustic waves into the bridge deck. The resulting reflected sound waves are collected by a receiver that is tightly coupled to the surface of the bridge. The technique is useful for locating delaminations and cracks in concrete. The impact echo technique is limited in usefulness due to the recording time per measurement (0.5 seconds or greater), its diminished capabilities when used on asphalt-overlaid concrete and because it cannot locate corroded rebars.

Many concrete bridge decks are covered with a layer of material such as, for example asphalt. When a layer of asphalt is present, the hammer sounding, chain dragging, and visual inspection techniques are ineffective. The asphalt absorbs the sound waves or interferes with the resolution of the sound waves, and visual insection is ineffective because the surface of the bridge deck can not be seen through the layer of asphalt. Consequently, to use one of these techniques at all, the layer of asphalt must be peeled away, which adds more cost and time to the bridge inspection process and makes it inherently destructive.

The above-described techniques may be referred to as non-invasive techniques because they do not require invading or penetrating the concrete structure to determine its structural integrity. An alternative to these non-invasive techniques would be to actually penetrate the concrete structure at various points to determine the structural integrity of the concrete structure at those points. Such invasive techniques, however, are time consuming, costly, and damaging to the structural integrity of the bridge deck.

Thus, the need exists for a reliable, fast, cost-effective and non-invasive technique to locate deteriorated areas of concrete structures, particularly reinforced concrete bridge decks covered with asphalt.

SUMMARY OF THE INVENTION

Ground penetrating radar (GPR) is a technique that may be used to image the inside of a structure by collecting the echoes (or reflections) resulting from electromagnetic signals such as, for example, electromagnetic waves of typically high frequency, being radiated into the structure. Typically, the rebars inside of a reinforced concrete structure are strong radar wave reflectors. Locating deteriorated areas within a reinforced concrete structure may be accomplished by analyzing the reflections, particularly the amplitudes of the reflections, from the rebars in the reinforced concrete structure. Furthermore, the extent of deterioration of these located areas may be determined from such analysis.

Significantly, the system and method described herein, when applied to determine the extent of deterioration of one or more areas of a reinforced concrete bridge deck, is effective even if a layer of asphalt is laminated to the surface of the reinforced bridge deck.

In an embodiment, a method of determining a condition of a substantially concrete structure is provided. One or more computer-readable data signals is received, where each data signal represents an electromagnetic signal detected from an area of the concrete structure. One or more of the detected electromagnetic signals include electromagnetic energy reflected from the concrete structure as a result of an electromagnetic signal transmitted into the concrete structure. An extent of deterioration of one or more areas of the substantially concrete structure are determined from the one or more computer-readable data signals.

In an optional aspect of this embodiment, one or more of the data signals is selected, the amplitude of each selected data signal is determined, and the extent of deterioration of the one or more areas is determined from the determined amplitudes.

In another optional aspect of this embodiment, the substantially concrete structure contains one or more reinforcing bars, and each selected data signal corresponds to a reinforcing bar. Further, the determined amplitude of each selected signal is an amplitude resulting from electromagnetic energy reflected from the corresponding reinforcing bar.

In yet another aspect of this embodiment, the substantially concrete structure has a first side, and each transmitted electromagnetic signal was transmitted at a different position along the first side of the concrete structure, and each data signal represents an electromagnetic signal collected over a period of time. For each selected signal, a time interval of the data signal during which the electromagnetic energy reflected from the corresponding reinforcing bar was detected is selected. A peak amplitude of the data signal during the selected time interval is determined. For one or more spatial intervals of a first length along the first side of the substantially concrete structure, a data signal with a peak amplitude of a highest magnitude is selected from among data signals corresponding to electromagnetic signals transmitted within the spatial interval.

In other optional aspect of this embodiment, the data signals are migrated to facilitate selecting the data signal with a peak amplitude of the highest magnitude.

In another optional aspect of this embodiment, the substantially concrete structure has a first side from which the transmitted and detected electromagnetic signals are transmitted and detected, respectively. For each determined amplitude, the determined amplitude is adjusted to accommodate for attenuation of the selected signal due to a distance of the corresponding reinforcing bar from the first side. The extent of deterioration of the one or more areas is determined from the adjusted amplitudes.

In another optional aspect of this embodiment, for each determined amplitude, the determined amplitude is inversely related to an extent of deterioration of the area of the concrete structure corresponding to the data signal from which the determined amplitude was determined.

In yet another optional aspect of this embodiment, the substantially concrete structure has a first side, and for each determined amplitude, a coordinate of the determined amplitude on a representation of the first side is determined. The two-dimensional representation of the first side of the substantially concrete structure is displayed and each determined amplitude is represented at the determined coordinate with a value corresponding to the determined amplitude. The extent of deterioration of the one or more areas is determined by visually inspecting the two-dimensional representation.

In another optional aspect of this embodiment, each determined amplitude is represented in the two-dimensional representation as a color or grayscale value.

In another embodiment, the data signals include one or more first data signals corresponding to electromagnetic energy having an electric field polarized primarily in the first direction and one or more second data signals corresponding to electromagnetic energy having an electric field polarized primarily in the second direction substantially orthogonal to the first direction, and each first data signal has an associated second data signal detected from substantially a same area as the first data signal. For each first data signal, an associated second data signal is subtract from the first data signal to produce a third signal. The extent of deterioration of the one or more areas is determined from the third signal.

In an optional aspect of this embodiment, an amplitude of each selected signal is determined, and the extent of deterioration of the one or more areas is determined from the determined amplitudes.

In another optional aspect of this embodiment, the substantially concrete structure contains one or more reinforcing bars, and the determined amplitude of each selected third signal is an amplitude resulting from electromagnetic energy reflected from one or more of the one or more reinforcing bars.

In another optional aspect of this embodiment, the substantially concrete structure has a first side, each transmitted electromagnetic signal having been transmitted at a different position along the first side of the concrete structure, wherein each data signal represents an electromagnetic signal collected over a period of time. For each third signal, a time interval of the third signal is selected during which the electromagnetic energy reflected from the one or more corresponding reinforcing bars was detected. A peak amplitude of the data signal during the selected time interval is determined, and the extent of deterioration of the one or more areas is determined from the peak amplitudes.

In another optional aspect of this embodiment, the substantially concrete structure has a first side from which the transmitted and detected electromagnetic signals are transmitted and detected, respectively, and the substantially concrete structure contains one or more reinforcing bars, and each determined amplitude corresponds to reflections of electromagnetic energy from one or more of the one or more reinforcing bars. For each determined amplitude, the determined amplitude is adjusted to accommodate for attenuation of the detected signals from which the determined amplitude is determined due to a distance of the one or more corresponding reinforcing bars from the first side. The extent of deterioration of the one or more areas is determined from the adjusted amplitudes.

In another optional aspect of this embodiment, for each determined amplitude, the determined amplitude is inversely related to an extent of deterioration of the area of the concrete structure corresponding to the data signals from which the determined amplitude was determined.

In another optional aspect of this embodiment, the substantially concrete structure has a first side. For each determined amplitude, a coordinate of the determined amplitude on a representation of the first side is determined. The two-dimensional representation of the first side of the substantially concrete structure is displayed, where each determined amplitude is represented at the determined coordinate with a value corresponding to the determined amplitude. The extent of deterioration of the one or more areas is determined by visually inspecting the two-dimensional representation.

In another optional aspect of this embodiment, each determined amplitude is represented in the representation as a color or grayscale value.

In another optional aspect of this embodiment, data representing electromagnetic signals not reflected from the substantially concrete structure is removed from each data signal, and it is determined from remaining data of the data signals whether one or more areas of deterioration are present within the substantially concrete structure.

In another optional aspect of this embodiment, at least a first side of the substantially concrete structure is adjacent to one or more layers of material, and the transmitted signal is transmitted through the one or more layers. Data representing electromagnetic signals reflected from the one or more layers is removed from each data signal.

In another embodiment, a system of determining the condition of a substantially concrete structure is provided. The system may include means for receiving one or more computer-readable data signals, wherein each data signal represents an electromagnetic signal detected from an area of the concrete structure, and wherein one or more of the detected electromagnetic signals include electromagnetic energy reflected from the concrete structure as a result of an electromagnetic signal transmitted into the concrete structure. The system may also include means for determining from the one or more computer-readable data signals an extent of deterioration of one or more areas of the substantially concrete structure.

In an optional aspect of this embodiment, the means for determining includes: means for selecting one or more of the data signals; means for determining an amplitude of each selected data signal; and means for determining the extent of deterioration of the one or more areas from the determined amplitudes.

In an optional aspect of this embodiment, the substantially concrete structure contains one or more reinforcing bars, and each selected data signal corresponds to a reinforcing bar, and the determined amplitude of each selected signal is an amplitude resulting from electromagnetic energy reflected from the corresponding reinforcing bar.

In an optional aspect of this embodiment, the substantially concrete structure has a first side, each transmitted electromagnetic signal having been transmitted at a different position along the first side of the concrete structure, wherein each data signal represents an electromagnetic signal collected over a period of time. The system further comprising: means for selecting, for each data signal, a time interval of the data signal during which the electromagnetic energy reflected from the corresponding reinforcing bar was detected; and means for determining, for each data signal, a peak amplitude of the data signal during the selected time interval, wherein the means for determining an amplitude includes, for one or more spatial intervals of a first length along the first side of the substantially concrete structure, means for selecting a data signal with a peak amplitude of a highest magnitude from among data signals corresponding to electromagnetic signals transmitted within the spatial interval.

In an optional aspect of this embodiment, the system further comprises: means for migrating the data signals to facilitate selecting the data signal with a peak amplitude of the highest magnitude.

In an optional aspect of this embodiment, the substantially concrete structure has a first side from which the transmitted and detected electromagnetic signals are transmitted and detected, respectively, and the means for determining from the amplitudes includes: means for adjusting, for each determined amplitude, the determined amplitude to accommodate for attenuation of the selected signal due to a distance of the corresponding reinforcing bar from the first side; and means for determining the extent of deterioration of the one or more areas from the adjusted amplitudes.

In an optional aspect of this embodiment, for each determined amplitude, the determined amplitude is inversely related to an extent of deterioration of the area of the concrete structure corresponding to the data signal from which the determined amplitude was determined.

In an optional aspect of this embodiment, the substantially concrete structure has a first side, and the means for determining the extent of deterioration of the one or more areas from the determined amplitudes includes: means for determining, for each determined amplitude, a coordinate of the determined amplitude on a two-dimensional representation of the first side; means for displaying the two-dimensional representation of the first side of the substantially concrete structure, wherein each determined amplitude is represented at the determined coordinate with a value corresponding to the determined amplitude; and means for determining the extent of deterioration of the one or more areas by visually inspecting the two-dimensional representation.

In an optional aspect of this embodiment, each determined amplitude is represented in the two-dimensional representation as a color or grayscale value.

In an optional aspect of this embodiment, the data signals include one or more first data signals corresponding to electromagnetic energy having an electric field polarized primarily in the first direction and one or more second data signals corresponding to electromagnetic energy having an electric field polarized primarily in the second direction substantially orthogonal to the first direction, wherein each first data signal has an associated second data signal detected from a same area as the first data signal, and wherein the means for determining includes: means for subtracting, for each first data signal, from the first data signal the associated second data signal to produce a third signal; and means for determining the extent of deterioration of the one or more areas from the third signal.

In an optional aspect of this embodiment, the means for determining further includes: means for determining an amplitude of each selected signal; and means for determining the extent of deterioration of the one or more areas from the determined amplitudes.

In an optional aspect of this embodiment, the substantially concrete structure contains one or more reinforcing bars, and the determined amplitude of each selected third signal is an amplitude resulting from electromagnetic energy reflected from one or more of the one or more reinforcing bars.

In an optional aspect of this embodiment, the substantially concrete structure has a first side, each transmitted electromagnetic signal having been transmitted at a different position along the first side of the concrete structure, each data signal represents an electromagnetic signal collected over a period of time, and, for each third signal, the system further comprises: means for selecting a time interval of the third signal during which the electromagnetic energy reflected from the one or more corresponding reinforcing bars was detected; and means for determining a peak amplitude of the data signal during the selected time interval, the extent of deterioration of the one or more areas is determined from the peak amplitudes.

In an optional aspect of this embodiment, the substantially concrete structure has a first side from which the transmitted and detected electromagnetic signals are transmitted and detected, respectively, and wherein the means for determining from the amplitudes includes means for adjusting, for each determined amplitude, the determined amplitude to accommodate for attenuation of the detected signals from which the determined amplitude is determined due to a distance of the corresponding reinforcing bar from the first side; and means for determining the extent of deterioration of the one or more areas from the adjusted amplitudes.

In an optional aspect of this embodiment, for each determined amplitude, the determined amplitude is inversely related to an extent of deterioration of the area of the concrete structure corresponding to the data signals from which the determined amplitude was determined.

In an optional aspect of this embodiment, the substantially concrete structure has a first side, and the means for determining the extent of deterioration of the one or more areas from the determined amplitudes includes: means for determining, for each determined amplitude, a coordinate of the determined amplitude on a two-dimensional representation of the first side; means for displaying the two-dimensional representation of the first side of the substantially concrete structure, wherein each determined amplitude is represented at the determined coordinate with a value corresponding to the determined amplitude; and means for determining the extent of deterioration of the one or more areas by visually inspecting the two-dimensional representation.

In an optional aspect of this embodiment, each determined amplitude is represented in the two-dimensional representation as a color or grayscale value.

In an optional aspect of this embodiment, the means for determining includes: means for removing from each data signal data representing electromagnetic signals not reflected from the substantially concrete structure; and means for determining from remaining data of the data signals whether one or more areas of deterioration are present within the substantially concrete structure.

In an optional aspect of this embodiment, at least a first side of the substantially concrete structure is adjacent to one or more layers of material, and the transmitted signal is transmitted through the one or more layers, and the means for removing includes: means for removing, from each data signal, data representing electromagnetic signals reflected from the one or more layers.

In another embodiment, a system for determining the condition of a substantially concrete structure is provided. The system comprises: a computer-readable storage medium to store one or more computer-readable data signals, wherein each data signal represents an electromagnetic signal detected from the concrete structure and one or more of the detected electromagnetic signals include electromagnetic energy reflected from an area within the concrete structure as a result of an electromagnetic signal transmitted into the concrete structure; and a data analysis application to receive the computer-readable data signals and determine from the data signals an extent of deterioration of one or more areas of the substantially concrete structure.

In an optional aspect of this embodiment, the data analysis application includes: a first selection module to receive as input the one or more data signals, select one or more of the one or more data signals, and output the selected signals; and an amplitude determination module to receive the selected signals, determine an amplitude of each selected data signal, and output the determined amplitudes, the extent of deterioration of the one or more areas is determined from the determined amplitudes.

In an optional aspect of this embodiment, the substantially concrete structure contains one or more reinforcing bars, and each selected data signal corresponds to a reinforcing bar, and the determined amplitude of each selected signal is an amplitude resulting from electromagnetic energy reflected from the corresponding reinforcing bar.

In an optional aspect of this embodiment, the substantially concrete structure has a first side, each transmitted electromagnetic signal having been transmitted at a different position along the first side of the concrete structure, wherein each data signal represents an electromagnetic signal collected over a period of time, the data analysis module further including: a time interval selection module to receive the one or more data signals, to select, for each data signal, a time interval of the data signal during which the electromagnetic energy reflected from the corresponding reinforcing bar was detected, and to output the selected time intervals; and a peak amplitude determination module to receive the one or more data signals, to determine, for each data signal, a peak amplitude of the data signal during the selected time interval, and to output the peak amplitudes, and the first selection module selects, for one or more spatial intervals of a first length along the first side of the substantially concrete structure, a data signal with a peak amplitude of a highest magnitude from among data signals corresponding to electromagnetic signals transmitted within the spatial interval.

In an optional aspect of this embodiment, the system further comprises a data migration module to receive the one or more data signals, to migrate the data signals, and to output the migrated signals to the first selection module, wherein the migration of the data signals facilitates the selecting of the data signal with a peak amplitude of the highest magnitude.

In an optional aspect of this embodiment, the system further comprises: a graphical user interface to receive the one or more data signals and display a representation of the one or more data signals as a function of time with respect to the first side of the concrete structure, to receive one or more first user-selected inputs, each first input indicative of a time interval, and to send each user-selected time interval to the first selection module, and the first selection module selects each selected time interval in accordance with one of the user-selected time interval.

In an optional aspect of this embodiment, the graphical user interface receives one or more second user-selected inputs, each second input indicative of a spatial interval along the first side of the concrete structure, and sends each user-selected spatial interval to the first selection module, and the first selection module determines each spatial interval in accordance with one of the user-selected spatial intervals.

In an optional aspect of this embodiment, the substantially concrete structure has a first side from which the transmitted and detected electromagnetic signals are transmitted and detected, respectively, and wherein the amplitude determination module includes: an adjustment module to receive the determined amplitudes, to adjust each determined amplitude to accommodate for attenuation of the selected signal from which the amplitude was determined due to a distance of the reinforcing bar corresponding to the selected signal from the first side, and output the adjusted amplitudes, and the extent of deterioration of the one or more areas is determined from the adjusted amplitudes.

In an optional aspect of this embodiment, for each determined amplitude, the determined amplitude is inversely related to an extent of deterioration of the area of the concrete structure corresponding to the data signal from which the determined amplitude was determined.

In an optional aspect of this embodiment, the substantially concrete structure has a first side, and the data analysis application further includes: a coordinate determination module to receive the selected data signals, determine, for each determined amplitude, a coordinate of the determined amplitude on a two-dimensional representation of the first side, and output the determined coordinates, and the system further comprises a display device to receive the determined coordinates and display the two-dimensional representation of the first side of the substantially concrete structure, each determined amplitude represented at the determined coordinate with a value corresponding to the determined amplitude, and the extent of deterioration of the one or more areas is determined by visual inspection of the two-dimensional representation.

In an optional aspect of this embodiment, each determined amplitude is represented in the two-dimensional representation as a color or grayscale value.

In an optional aspect of this embodiment, the data signals include one or more first data signals corresponding to electromagnetic energy having an electric field polarized primarily in the first direction and one or more second data signals corresponding to electromagnetic energy having an electric field polarized primarily in the second direction substantially orthogonal to the first direction, wherein each first data signal has an associated second data signal detected from a same area as the first data signal, and wherein the data analysis application includes: a subtraction module to receive the first and second data signals, to subtract, for each first data signal, the associated second data signal from the first data signal to produce a third signal, and the extent of deterioration of the one or more areas is determined from the third signal.

In an optional aspect of this embodiment, the data analysis application further includes: an amplitude determination module to receive the third signals, determine an amplitude of each third signals, and output the determined amplitudes, and the extent of deterioration of the one or more areas is determined from the determined amplitudes.

In an optional aspect of this embodiment, the substantially concrete structure contains one or more reinforcing bars, and wherein the determined amplitude of each selected third signal is an amplitude resulting from electromagnetic energy reflected from one or more of the one or more reinforcing bars.

In an optional aspect of this embodiment, the substantially concrete structure has a first side, each transmitted electromagnetic signal having been transmitted at a different position along the first side of the concrete structure, and each data signal represents an electromagnetic signal collected over a period of time, and wherein, for each third signal, data analysis module further includes: a time interval selection module to receive the one or more data signals, to select, for each data signal, a time interval of the data signal during which the energy reflected from the one or more corresponding reinforcing bars was detected, and to output the selected time intervals; and a peak amplitude determination module to receive the one or more data signals, to determine, for each data signal, a peak amplitude of the data signal during the selected time interval, and to output the peak amplitudes, and the extent of deterioration of the one or more areas is determined from the peak amplitudes.

In an optional aspect of this embodiment, the system further comprises: a graphical user interface to receive the one or more data signals and display a representation of the one or more data signals with respect to the first side of the concrete structure, each signal plotted as a function of time, to receive one or more first user-selected inputs, each first input indicative of a time interval, and to send each user-selected time interval to the first selection module, and the first selection module selects each selected time interval in accordance with one of the user-selected time interval.

In an optional aspect of this embodiment, the substantially concrete structure has a first side from which the transmitted and detected electromagnetic signals are transmitted and detected, respectively, and wherein the substantially concrete structure contains one or more reinforcing bars, and wherein each determined amplitude corresponds to reflections of electromagnetic energy from one or more of the one or more reinforcing bars, and the amplitude determination module includes: an adjustment module to receive the determined amplitudes, to adjust each determined amplitude to accommodate for attenuation of the selected signal from which the amplitude was determined due to a distance from the first side of the one or more reinforcing bar corresponding to the selected signal, and output the adjusted amplitudes, and the extent of deterioration of the one or more areas is determined from the adjusted amplitudes.

In an optional aspect of this embodiment, for each determined amplitude, the determined amplitude is inversely related to an extent of deterioration of the area of the concrete structure corresponding to the data signals from which the determined amplitude was determined.

In an optional aspect of this embodiment, the substantially concrete structure has a first side, and the data analysis application further includes: a coordinate determination module to receive the third signals, determine, for each determined amplitude, a coordinate of the determined amplitude on a two-dimensional representation of the first side, and output the determined coordinates, and the system further includes a display device to receive the determined coordinates and display the two-dimensional representation of the first side of the substantially concrete structure, each determined amplitude represented at the determined coordinate with a value corresponding to the determined amplitude, and the extent of deterioration of the one or more areas is determined by visual inspection of the two-dimensional representation.

In an optional aspect of this embodiment, each determined amplitude is represented in the two-dimensional representation as a color or grayscale value.

In an optional aspect of this embodiment, the data analysis application includes: a data adjustment module to receive the one or more data signals, adjust each signal by removing from each data signal data representing electromagnetic signals not reflected from the substantially concrete structure, output the adjusted signals, and the extent of deterioration at one or more areas within the substantially concrete structure is determined from the adjusted data signals.

In an optional aspect of this embodiment, at least a first side of the substantially concrete structure is adjacent to one or more layers of material, and each transmitted signal is transmitted through the one or more layers, and wherein the data removed by the data adjustment module includes data representing electromagnetic signals reflected from the one or more layers.

In another embodiment, method of determining the condition of at least a portion of a substantially concrete structure is provided. The method comprises transmitting one or more electromagnetic signals into the substantially concrete structure; for each transmitted signal, detecting a corresponding electromagnetic signal from the substantially concrete structure, the detected signal including electromagnetic energy reflected from the substantially concrete structure as a result of the transmitted signal; and determining from the data signals an extent of deterioration of one or more areas within the substantially concrete structure.

These and other features and advantages of the invention will be more readily understood and appreciated from the detailed description below, which should be read together with the accompanying drawing figures.

BRIEF DESCRIPTION OF THE DRAWINGS

In the drawings:

FIGS. 10A–10D are graphical representations of data signals representing electromagnetic signals detected along a length of a concrete structure illustrating an embodiment of a method for determining the extent of deterioration for one or more areas of a concrete structure;

DETAILED DESCRIPTION

The following description is merely illustrative and not limiting, and is presented by way of example only. Thus, although the following describes an embodiment of determining an extent of deterioration of a concrete structure, using a reinforced concrete bridge deck as an example, the system and method described herein may be applied to other inhomogeneous structures, particularly concrete structures, containing a reflective material such as, for example, metal. Further, although the following describes an embodiment using a concrete structure, the system and method described herein may be applied to structures made from other materials having similar electrical properties (e.g. permittivity) and physical properties to concrete.

Several models of the Subsurface Interface Radar (SIR®) System available from Geophysical Survey Systems, Inc. (GSSI), of North Salem, N.H., are suitable commercial GPR systems for determining the extent of deterioration of one or more areas of a reinforced concrete bridge deck as described herein. Other commercial systems may be used.

Figure 1:
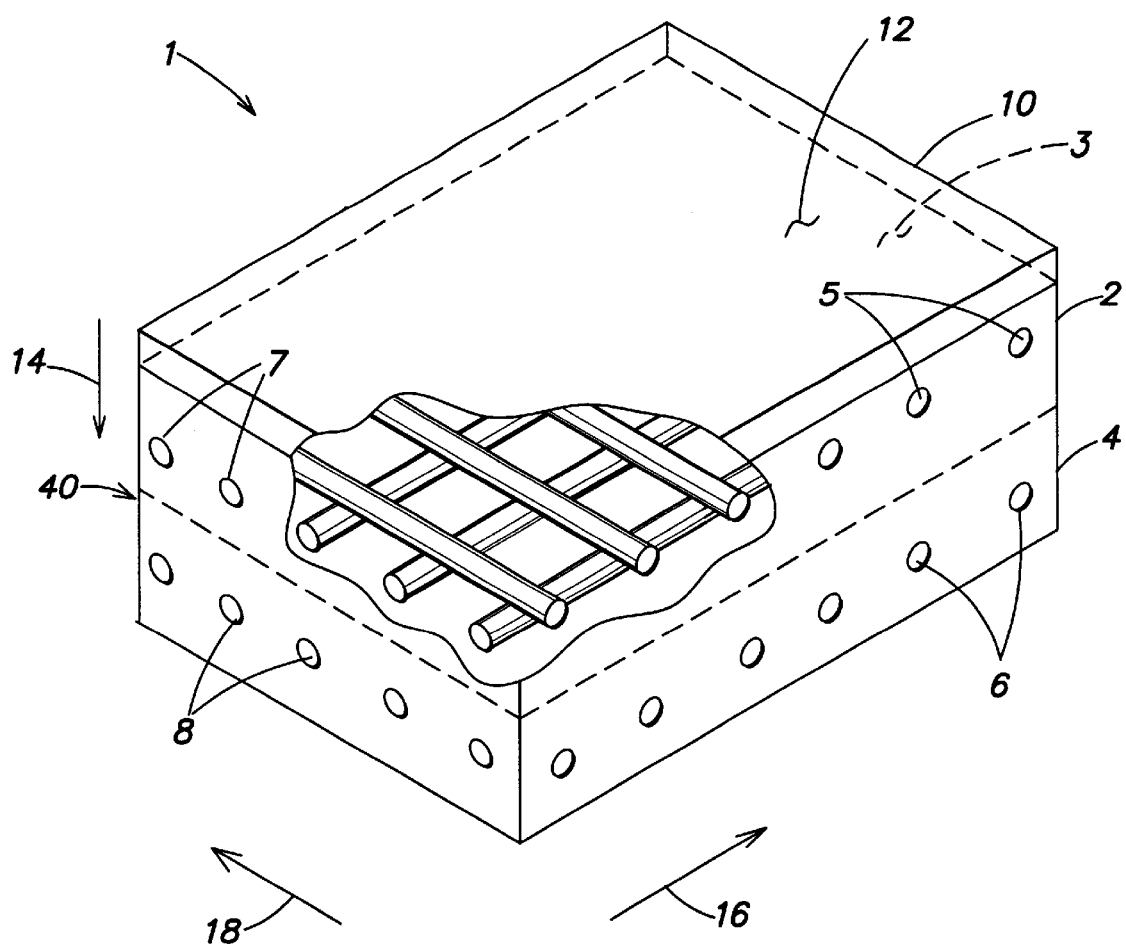
FIG. 1 is a perspective view of an illustrative embodiment of a portion of a reinforced concrete structure.
Figure 2:
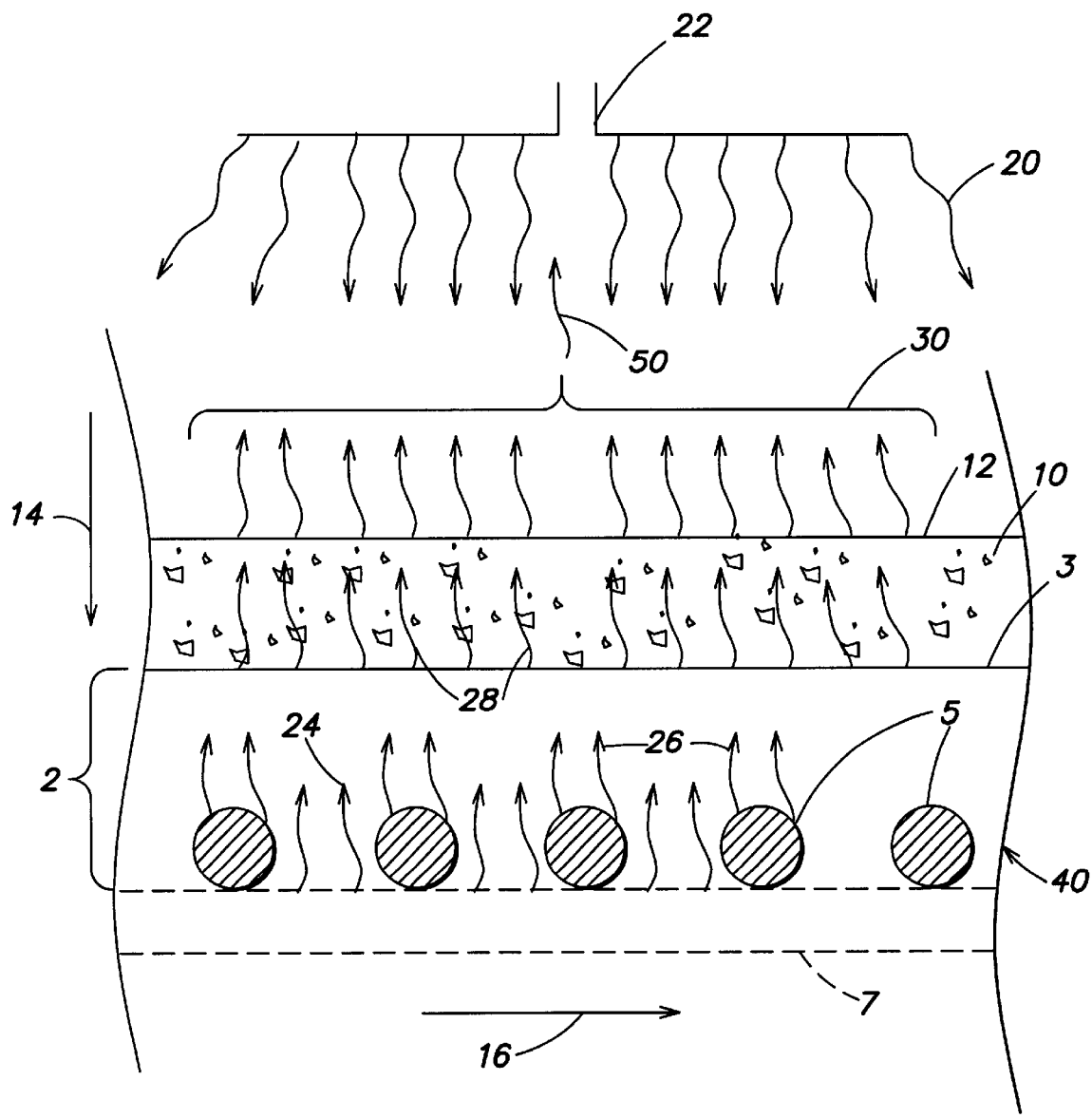
FIG. 2 is a cross-sectional view of an embodiment of a section of a reinforced concrete structure.

FIG. 1 illustrates an example portion of a reinforced concrete bridge deck 1 including a layer 40 of reinforced concrete having a concrete surface 3 and a layer 10 of asphalt, or other suitable material for bearing traffic loads, having an asphalt surface 12. FIG. 2 is a cross-sectional view of a portion of the reinforced concrete bridge deck of FIG. 1. For illustrative purposes, the intended path of traffic is indicated by directional indictor 16, which is hereafter also referred to as the longitudinal direction, which corresponds to a length of the bridge deck. Directional indicator 18 indicates a transverse direction corresponding to the width of the bridge deck, and directional indicator 14 indicates a depth corresponding to the thickness of the bridge deck.

Reinforced Concrete bridge decks typically contain rebars 5–8 to provide tensile strength. Such rebars 5–8 generally range in diameter from ½–1 inches (1.27–2.54 centimeters (cm)), typically having a diameter between ⅝–¾ inches (1.59–1.91 cm). These reinforcement bars typically form two layers 2, 4. The top of the top layer 2 is typically located between about 2 and 7.5 cm below the concrete surface. Due to changes in rebar placement depths over the years, the distance between the top layer 2 and the bottom layer 4 varies, with typical distances ranging from 1¼–4 inches (3.18–10.16 cm) for a typical reinforced bridge deck thickness of 7.5 inches (19 cm). The rebars 5 and 6 that are substantially perpendicular to the travel path on the bridge are referred to herein as transverse bars, and the rebars 7 and 8 substantially parallel to the travel path are referred to herein as longitudinal rebars. Typically, each rebar layer 2 and 4 is comprised of one or more transverse rebars and one or more longitudinal rebars. Top layer 2 includes transverse rebars 5 and longitudinal bars 7, and bottom layer 4 includes transverse bars 6 and longitudinal bars 8.

For illustrative purposes, for each rebar layer 2,4, the transverse rebars 5,6 will be described herein as being above corresponding longitudinal rebars 7,8, respectively. However, in an alternative embodiment, for each rebar layer 2,4, the longitudinal rebars 7,8 may be above the corresponding transverse rebars 5,6.

Transverse and longitudinal rebars of a same layer are typically affixed together, so that the distance from the top of the transverse rebars 5,6 to the top of the longitudinal rebars 7,8, respectively is the diameter of the transverse rebars 5,6, respectively. Some bridge decks and other concrete structure may have only one layer of rebar, other structures may have rebars aligned in only one direction, for example, transverse or longitudinal, and yet others may have transverse bars located below longitudinal bars.

Rebars of a same layer and of a particular alignment such as, for example, transverse or longitudinal, are typically separated by a distance ranging from 10–30 cm.

GPR technology provides an accurate technique for locating deteriorated areas of concrete bridge deck by recognizing and exploiting the inherent contrast in electromagnetic properties between deteriorated concrete and sound concrete. Specifically, the attenuation of an electromagnetic signal transmitted through reinforced concrete is greater when transmitted through deteriorated concrete than when transmitted through sound concrete. In other words, the amplitude or strength of an electromagnetic signal transmitted through reinforced concrete is lower when transmitted through deteriorated concrete than when transmitted through sound concrete.

There are at least two physical conditions of reinforced concrete indicative of deterioration that decrease the strength of an electromagnetic signal transmitted through the reinforced concrete. The first physical condition is rebar corrosion which decreases the tensile strength of the rebar and may lead to other forms of deterioration. When a rebar corrodes, the surface of the rebar oxidizes, thus decreasing the amount of non-oxidized surface. Then an electromagnetic signal impacts the surface of a corroded rebar, less energy is reflected and the amplitude of the reflection is less than if no oxidation were present on the surface of the rebar.

The second physical condition is moisture, which leads to deterioration in concrete and the corrosion or rebars. Further, in concrete structures having a protective waterproof membrane, asphalt, or both, the presence of moisture may indicate a failure of the asphalt or membrane and, consequently, a greater likelihood of deterioration in the structure. The conductivity of moist concrete is higher than that of dry concrete. Thus, propagating electromagnetic energy is more highly absorbed in moist concrete relative to dry concrete. Consequently, when an electromagnetic signal is transmitted through moist concrete, the amplitude of the signal at any given point is less than if the signal were transmitted through sound concrete.

Determining the extent of deterioration at one or more areas within the concrete structure includes collecting data indicative of the extent of deterioration at one or more portions of a reinforced concrete bridge deck, and analyzing the collected data. Analyzing the data is discussed in more detail below in connection with FIGS. 5–16.

Collecting the data may include transmitting one or more electromagnetic signals into the reinforced concrete bridge deck, and detecting one or more electromagnetic signals from the bridge deck. Each detected electromagnetic signal 50 may include electromagnetic energy reflected from one or more rebars.

In an embodiment of collecting electromagnetic signals, electromagnetic signals 20 such as, for example, pulses of electromagnetic energy or radar waves, may be transmitted from a transmitting antenna 22 above the bridge deck surface 12 into the bridge deck 1. For each electromagnetic signal 20 transmitted into the bridge deck 1, a corresponding electromagnetic signal 50 of electromagnetic energy may be detected. When a transmitted electromagnetic signal 20 is propagated through the bridge deck 1, the electromagnetic signal 20 may be reflected by: the asphalt surface 12 producing asphalt surface reflections (reflected electromagnetic energy) 30; the concrete surface interface 3 producing concrete surface reflections 28; and the top layer 2 of rebars producing rebar reflections 24,26. Thus a detected electromagnetic signal 50 may include asphalt surface reflections 30, concrete surface reflections 28, and rebar reflections 24, 26. Further, in an embodiment using a different antenna to detect than transmit, the detected electromagnetic signal 50 may also include electromagnetic energy transmitted directly from the transmitting antenna to the receiving antenna, referred to herein as a direct-coupled signal.

These reflections 24, 26, 28, 30 and the direct-coupled signal may be detected at different times for a given transmitted signal 20 depending on the distance each signal travels and the electrical properties, such as the permittivity, of the mediums through which the signal travels.

In an exemplary embodiment, reflections 24, 26, 28, 30 may then be detected by the transmitting antenna 22. In an alternative embodiment, these reflections 24, 26, 29, 30 may be received by a receiving antenna proximate to the transmitting antenna 22.

Of the reflections 24, 26 from the top layer 2, the transverse reflections 26 from the transverse rebars 5, which are typically above the longitudinal rebars 7, may be significantly stronger than the longitudinal reflections 24 from the longitudinal rebars 7. To ensure that the transverse reflections 26 are significantly stronger than the longitudinal reflections 24, the transmitted signal 20 may have a primary electric field polarized in a direction substantially parallel to the transverse rebars 5 and substantially orthogonal to the longitudinal rebars 7.

In an embodiment, the greatest angle between the alignment of any transverse rebar 5 and the primary electrical field polarization is 45°.

Further, transverse reflections 26 are significantly stronger than reflections from rebars 6,8 of the bottom layer 4 because the transverse rebars 5 are typically over 3 cm closer to the surface of the bridge deck 1 than rebar 6, 8 of the bottom layer 4. Consequently, the distance traveled by a transverse reflection 26 is less than the distance traveled by a longitudinal reflection 24. As is well known to those skilled in radar technology, the strength of a radiated electromagnetic signal from a dipole-like antenna, decreases due to geometrical spreading losses as it travels through a medium. If the medium is concrete, additional signal strength losses are introduced due to conductivity and scattering. Therefore, the added distance traveled by a longitudinal reflection 24 in the concrete layer 40, compared to the distance traveled by the transverse reflection 26 in the concrete layer 40, reduces the strength of the longitudinal reflection 24.

As discussed above, the depth of the top layer of transverse rebars 5 may be as little as 2 cm beneath the concrete surface 3. To confidently measure the amplitude of transverse reflections 26 resulting from a single electromagnetic signal 20, the transverse reflections 26 must be capable of being isolated (in time) from reflections 28, 30 and the direct-coupling signal of the detected electromagnetic signal 50.

Figure 3:
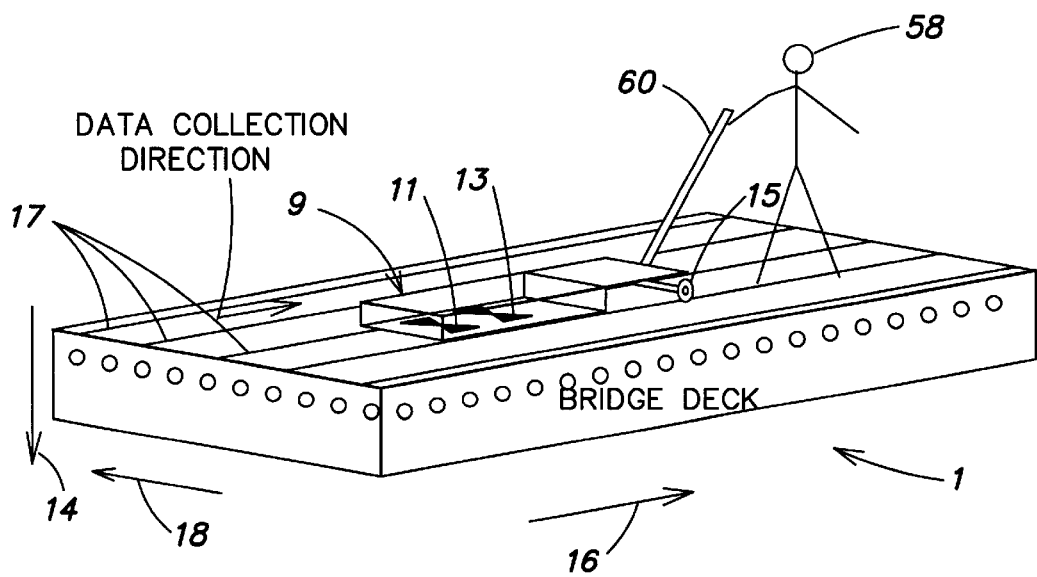
FIG. 3 is a perspective view of an illustrative embodiment of a reinforced concrete structure depicting an embodiment of collecting electromagnetic data from the concrete structure.

In an embodiment of collecting data, to be able to isolate transverse reflections 26 from rebars at a depth as shallow as 2 cm, the transmitting antenna, and receiving antenna if different than the transmitting antenna, preferably are closely coupled to the surface of the bridge deck 1, which may be the concrete surface 3 or the asphalt surface 12 if asphalt is present. For example, the transmitting and receiving antennas may be placed in an enclosure having a first side of 6.6 millimeters thickness. Such a closely-coupled antenna may be referred to herein as a ground-coupled antenna. This first side may be in contact with the enclosed antenna and the surface of the bridge deck 1. FIG. 3 illustrates an embodiment of a ground-coupled antenna module 9 comprising a ground-coupled transmitting antenna 11 such as, for example, a dipole-like antenna, and a ground-coupled receiving antenna 13 such as, for example, a dipole-like antenna. FIG. 3 is discussed in more detail below.

In a suitable embodiment, in order to be able to detect signals whose amplitudes accurately reflect the extent of deterioration of a given area, a ground-coupled antenna transmits electromagnetic signals at a center frequency that satisfies two criteria. First, the center frequency is adequate to produce detected electromagnetic signals 50 where the transverse reflections 26 are capable of being distinguished (isolated in time) from the concrete surface reflections 28. Second, the frequency is adequate to provide a transmitted electromagnetic signal strong enough to produce a transverse reflection 26 capable of being detected. In an embodiment, to satisfy these two criteria, the transmitting antenna 22 transmits at a center frequency of 1.5. GHz. Such an antenna is described in U.S. Patent application entitled DETERMINING THE DEPTH OF REINFORCING BARS IN A CONCRETE STRUCTURE USING ELECTROMAGNETIC SIGNALS by Roger L. Roberts (the Roberts application), filed on even date herewith. The entire contents of the Roberts application are herein incorporated by reference. A suitable commercial antenna transmitting at a center frequency of 1.5 GHz is the Model 5100 Antenna available from GSSI. Other commercial systems may be used.

In an embodiment, the transmitted electromagnetic signal 20 may have a short duration relative to the difference in arrival times of the reflections 24, 26, 28, 30. Such a short duration lessens the overlap between arrival times of the reflections 24, 26, 28, 30 so that the reflections 24, 26, 28, 30 are capable of being distinguished. In an optional aspect of this embodiment, the duration of the transmitted electromagnetic signal 20 is approximately 700 picoseconds ($7\times10^{-10}$ seconds).

An embodiment of a method of analyzing the detected signals 50 to isolate the transverse reflection 26 from a detected electromagnetic signal 50 is described in more detail below in connection to FIGS. 7, 9, 10A and 10B.

In an alternative embodiment of collecting data, to be able to isolate the transverse reflections 26 from the detected electromagnetic signal 50, for each position from which electromagnetic energy is transmitted, two transmitted signals 20 are transmitted and two corresponding electromagnetic signals detected. The first transmitted signal has a primary electric field polarized in a first direction substantially parallel to the transverse rebars 5. The second transmitted signal has a primary electric field polarized in a second direction substantially orthogonal to the first direction and the transverse rebars 5. When both signals with the same strength are transmitted and received from a same position relative to the bridge deck 1 and in the same direction, the asphalt surface reflections 30, the concrete surface reflections 28, and the direct-coupling signals included in each of the corresponding detected electromagnetic signals 50 should be essentially equal. If different devices are used to detect each electromagnetic signal, some differences may result from differences in the electrical components of the devices used to detect the signals.

The transverse reflections 26 resulting from the first transmitted signal may, however, have a much higher amplitude than the transverse reflection 26 resulting from the second transmitted signal, due to the alignments of electric fields described above, and the sensitivity of rebars 5 to the polarization of the electric field of the transmitted signals. In an embodiment, the greatest angle between the alignment of any transverse rebar 5 and the primary electrical field polarization of the first transmitted signal is 45°. Thus, because the only significant difference between the first and second signals may be the amplitude of the transverse reflection 28, the transverse reflection 28 may be isolated by subtracting the second signal from the first signal. Such subtraction is described in more detail below in connection with FIG. 8B.

In an embodiment, first and second pairs of antennas are used to transmit the first and second transmitted signals, respectively, and receive the detect the corresponding electromagnetic signals. The first antennas are configured to transmit electromagnetic signals having a primary electric field polarized in the first direction substantially parallel to the transverse rebars 5, and the second antennas are configured to transmit electromagnetic signals having a primary electric field polarized in the second direction substantially orthogonal to the first direction and the transverse rebars.

Figure 4:
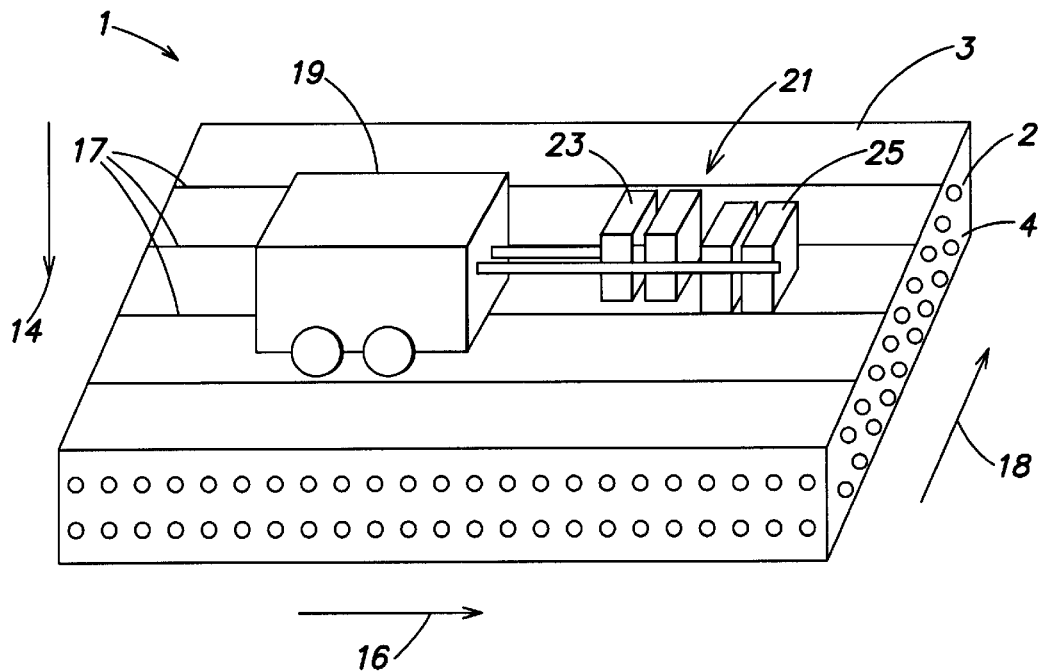
FIG. 4 is a perspective view of an illustrative embodiment of a reinforced concrete structure depicting an embodiment of collecting electromagnetic data from the concrete structure.

In an embodiment, both the first and second antennas are not closely coupled to the surface of the bridge deck 1 but are air-launched. FIG. 4 illustrates an embodiment of a first pair 25 and second pair 23 of air-launched antennas. Such air-launched antennas may be mounted, for example, 45 cm above the surface of the bridge deck 1. When the air-launched antennas are at such a height, the transverse reflections 26 from transverse rebars 5 separated up to 0.3 m may detected at nearly coincident arrival times due to the combination of the antenna height above the surface of the bridge deck and the fixed separation between the transmitting and receiving antennas.

In an exemplary embodiment, the transmitting air-launched antennas may be horn antennas to transmit electromagnetic waves substantially in the direction of the bridge deck 1.

In some embodiments, each air-launched transmitting antenna may transmit electromagnetic signals at a lower frequency than required to isolate individual transverse rebars 5, but strong enough to penetrate the surface of the concrete layer 40 to a depth adequate to impact the transverse rebars 5. In an optional aspect of this embodiment, each air-launched transmitting antenna is configured to transmit with a center frequency of about 1 GHz. A suitable commercial antenna transmitting at a center frequency of 1 GHz is the Model 4208 Antenna available from GSSI. Other commercial systems may be used.

In alternative embodiment of transmitting two electromagnetic signals, at each position on the surface of the bridge deck 1 from which electromagnetic signals 20 are transmitted, the same transmitting antenna 22 is used to transmit the first and second orthogonally-aligned signals. In such an embodiment, the transmitting antenna 22 transmits the first signal, is rotated 90°, and then transmits the second signal. Alternatively, the transmitting antenna may transmit a first signal at a plurality of positions. The transmitting antenna may then be reconfigured, and the transmitting antenna may then transmit a second signal at the same positions. In an aspect of this embodiment, the same antenna is used to transmit and receive. Alternatively, a separate antenna may be used to receive, and may be reconfigured or rotated as described above with respect to the transmitting antenna.

In an embodiment of collecting data, a plurality of electromagnetic signals are transmitted and received along one or more data collection paths. FIG. 3 illustrates an embodiment for transmitting and receiving a plurality of electromagnetic signals along one or more data collection paths 17 using ground-coupled antennas 11,13. FIG. 4 illustrates an embodiment for transmitting and receiving a plurality of electromagnetic signals along one or more data collection paths using air-launched antennas 23,25. In an embodiment, data collection paths are approximately parallel. Although collection paths 17 are approximately parallel to the longitudinal direction 16, the data may be collected in any direction along the surface of the bridge deck 1 such as, for example, the transverse direction 18.

The spacing between collection paths 17 depends on the desired resolution of the deteriorated areas. Typically, the spacing between each collection path 17 is approximately equal for an inspection of a bridge deck. In an embodiment, the spacing between each collection path spacing ranges from 0.3 to 0.6 meters (m).

The point along each collection path 17 at which an electromagnetic signal is transmitted and detected may be referred to herein as a data detection point, and the detected signals 50 at these points may be referred to herein as scans. The scan density (number of scans per unit length) along the collection paths 17 depends on the desired resolution between parallel transverse rebars 5. Further, the scan density chosen may depend on the frequency of the transmitted signal, and the distance from the surface of the bridge deck 1 of the transmitting and receiving antenna. In an embodiment where it is not necessary to isolate individual transverse reflections 26, the transmitting and receiving antennas may be air-launched, the transmitted signal may have a center frequency of approximately 1 GHz, and a scan density of approximately 10 to 20 scans/meter may be chosen.

In an alternative embodiment, where it desired to isolate individual transverse reflections 26 so that individual transverse rebars 5 may be imaged, the transmitting and receiving antennas may be ground-coupled, the transmitted signal may have a center frequency of approximately 1.5 GHz, and a scan density of approximately 40–80 scans/meter may be chosen.

The plurality of scans detected along a collection path may be analyzed to determine the extent of deterioration of portions of transverse rebars 5 located beneath each scan. Further, data extracted from scans of approximately parallel collection paths may be combined to produce a two-dimensional representation such as, for example, a contour map, of the bridge deck surface. Analyzing and combining the scans is discussed in more detail below in connection with FIGS. 5–16.

Electromagnetic signals may be collected as shown in FIG. 3, where a ground-coupled antenna unit 9 including a transmitting antenna 11 and receiving antenna 13 is moved along one or more collection paths 17 while closely-coupled to the surface of the bridge deck 1. Alternatively, as shown in FIG. 4, an air-launched antenna unit 21, including a transmitting antenna 23 and receiving antenna 25 is moved along one or more collection paths 17 while air-launched from the surface 3 of the bridge deck 1.

In a working embodiment, an antenna unit 9,21 may be moved manually such as, for example, in FIG. 3, where a ground-coupled antenna unit is pulled by a person 58 using a tow handle 60 or by an animal (e.g. a horse). Alternatively, an antenna unit 9,21 may be moved by a motorized vehicle 19 as shown in FIG. 4.

In an optional embodiment, data may be collected along a plurality of the collection paths 17 contemporaneously. For example, a plurality of antenna units 9,21 may be moved along parallel collection paths 17 contemporaneously by multiple persons, animals, or motorized vehicles or a single person, animal or motorized vehicle.

Each detected electromagnetic signal 50 is recorded on a recording medium such as a computer-readable medium such as, for example, a magnetic disk or a integrated semiconductor memory. Such data storage devices are discussed in more detail below. For each recorded signal, the location or position of the corresponding detected signal 50 is also recorded. The location may include the position of the detection point along the longitudinal direction 16 of the surface of the bridge deck and the position of the detection point along the transverse direction of the surface of the bridge deck 1.

In an embodiment, the distance along a collection path is determined by recording a starting point of the collection path, and by determining the distance traveled along the collection path from the starting point. This distance may be determined using a distance encoder wheel 15 as shown in FIG. 3 to detect the position of the detection point and to send the position information along with the detected electromagnetic signal 50 to the recording medium.

In an alternative embodiment, the location corresponding to a detection point of a detected electromagnetic signal 50 may be determined by using a global position satellite (GPS) receiver to receive position information from a GPS and send the position information along with the detected signal 50 to the recording medium.

Other known position determination techniques may be used to determine the position of a detection point.

A uniform scan interval along a collection path may be chosen in accordance with the scan density. For example, if the scan density is chosen to be 120 scans/meter, than a scan interval of 0.833 centimeters is chosen. A receiving antenna may be programmed or controlled to detect an electromagnetic signal once every scan interval. To activate detection by a receiving antenna, for each scan interval, the receiving antenna may receive a control signal from a position determination means such as a GPS receiver or distance encoder wheel as discussed above.

Alternatively, to maintain a uniform scan interval, an optical scanning device may be connected to the receiving antenna. A thin strip of material may by laminated to the surface of the bridge deck along an approximately parallel path to the desired collection path. The material scan interval. The optical scanning device may direct a light beam such as, for example, a laser beam, towards the thin strip as the receiving antenna (as well as the entire antenna unit) is moving along the collection path. The scanning device may detect reflections from the thin strip and determine from the reflections when to assert the control signal to activate the receiving antenna. This optical scanning device may be mounted on an adjustable arm extending from the antenna unit or a vehicle moving the antenna unit so that the same thin strip may be used for more than one collection path.

Such an optical scanning technique also may be used to maintain an approximately straight collection path. The optical scanning device could assert a warning signal or inactivate signal when no reflections from the thin strip are detected for a predetermined distance, indicating that the light beam is no longer impacting the thin strip.

Further, such an optical scanning device may also be used to determine the position of the detection points and send the determined position to the recording medium along with the corresponding detected signal 50.

Having now described several embodiments for collecting electromagnetic data from a reinforced concrete bridge deck, data analysis of the collected data will now be described.

While the detected electromagnetic signals 50 are being detected, or after some or all of the signals 50 have been detected, the data is then analyzed to determine the extent of deterioration of one or more areas of the reinforced concrete bridge deck 1. When trying to isolate individual rebars (for example, when a 1.5 GHz frequency ground-coupled antenna is used), an essential element of analyzing the detected data signals is to determine which detected signals 50 were detected at detection point most directly over a transverse rebar 5 (as stated above, if the longitudinal rebars 7 are above the transverse rebars in the top layer 2, then the longitudinal rebars would be the rebars of primary significance). Each of these determined signals may be referred to herein as a data signal corresponding to a transverse rebar 5.

A detection point is considered most directly over a transverse rebar 5 when detection is made at a point in time when a midpoint between the transmitting antenna and the receiving antenna is at its closest point along the collection path to a point on the top perimeter of the transverse rebar 5 corresponding to the intersection of a straight line between the center of the transverse rebar 5 and the surface 3 of the concrete deck, the straight line intersecting surface 3 at a right angle.

In an embodiment, this determination may be made by performing the following general steps: (1) locating the position of the direct coupling signal in each detected signal 50 and performing a time-zero adjustment, (2) migrating the data of the detected signals 50, and (3) determining which detected signals 50 correspond to a transverse rebar 5 by the comparing the transverse reflection amplitudes of each signal 50. The extent of deterioration of the area beneath the detection point of the detected signal 50 may then be determined. In an embodiment, the determined peak amplitudes are normalized before being compared.

The detected signals 50 corresponding to a transverse rebar 5 can be determined by comparing the transverse rebar reflection amplitudes of each signal 50 because the transverse reflection amplitude of a transverse rebar 5 has a highest value when the detection point is most directly over the transverse rebar 5. The amplitude is highest for a detection at this detection point for at least two reasons: (1) at this point, field pattern intersection of the transmitting and receiving antennas is at a highest level; and (2) at this point, on average, the electromagnetic energy reflected from transverse rebar 5 travels the shortest distance to the receiving antenna, thus losing minimal signal strength due to attenuation.

Figure 5:
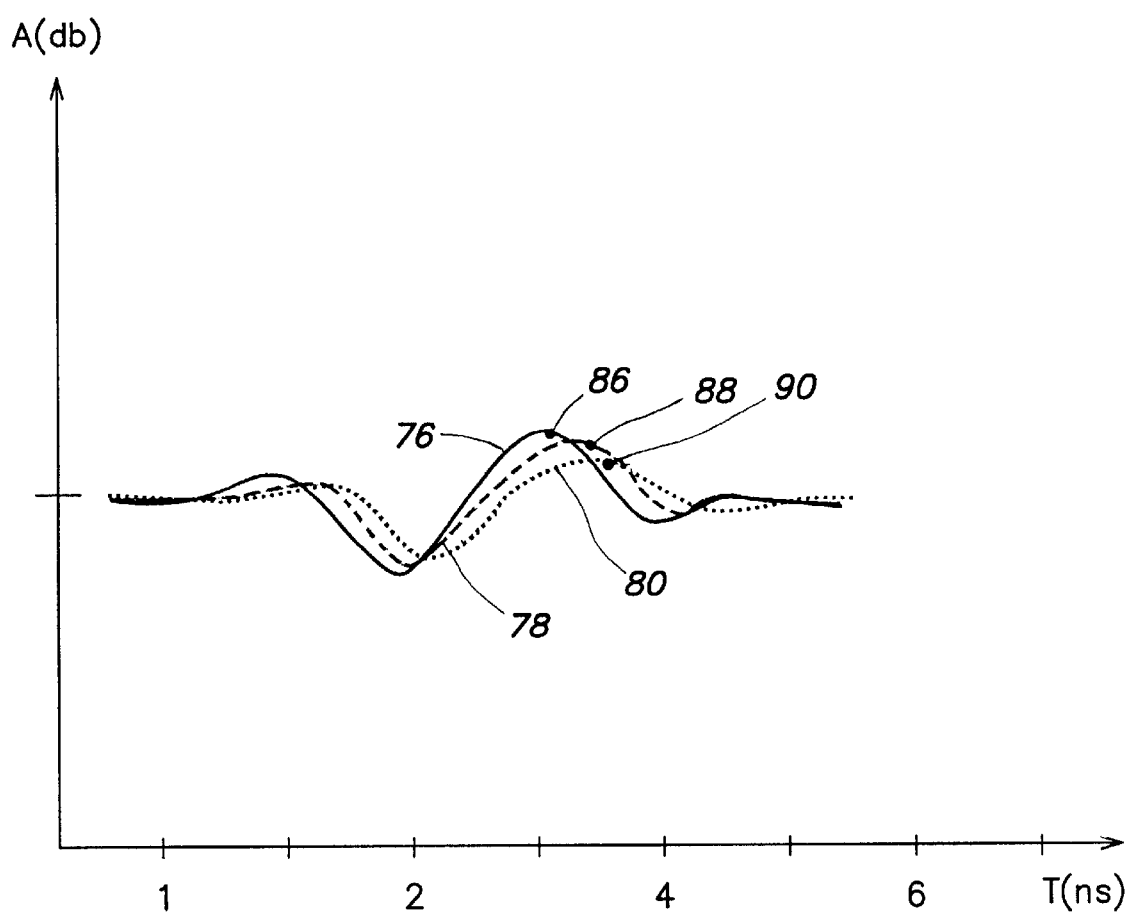
FIG. 5 is a graph illustrating an embodiment of a plurality of electromagnetic data signals detected from a concrete structure.

FIG. 5 is a graph illustrating an embodiment of plotted data signals 76, 78, and 80 representing transverse reflections 26 of detected electromagnetic signals 50. Such reflections may result when the transmitted signals 20 are each a wavelet. The signals are plotted in amplitude units versus time. Signal 76 represents a signal 50 detected at a detection point most directly over a transverse rebar 5. Signal 78 represents a signal 50 detected at a detection point proximate to the detection point corresponding to signal 76. Signal 80 represents a signal 50 detected at a detection point slightly further away from the detection point corresponding to signal 76 than the point corresponding to signal 78. The data signals 76, 78, 80 may represent three consecutive scans along a collection path 17. For the reasons discussed above, signal 76 has a greater transverse reflection amplitude 86 than the transverse reflection amplitude 88 of signal 78, which is greater than the transverse reflection amplitude 90 of signal 80. Furthermore, the arrival time of amplitude 86 is before amplitude 88, whose arrival time is before amplitude 90.

Figure 6:
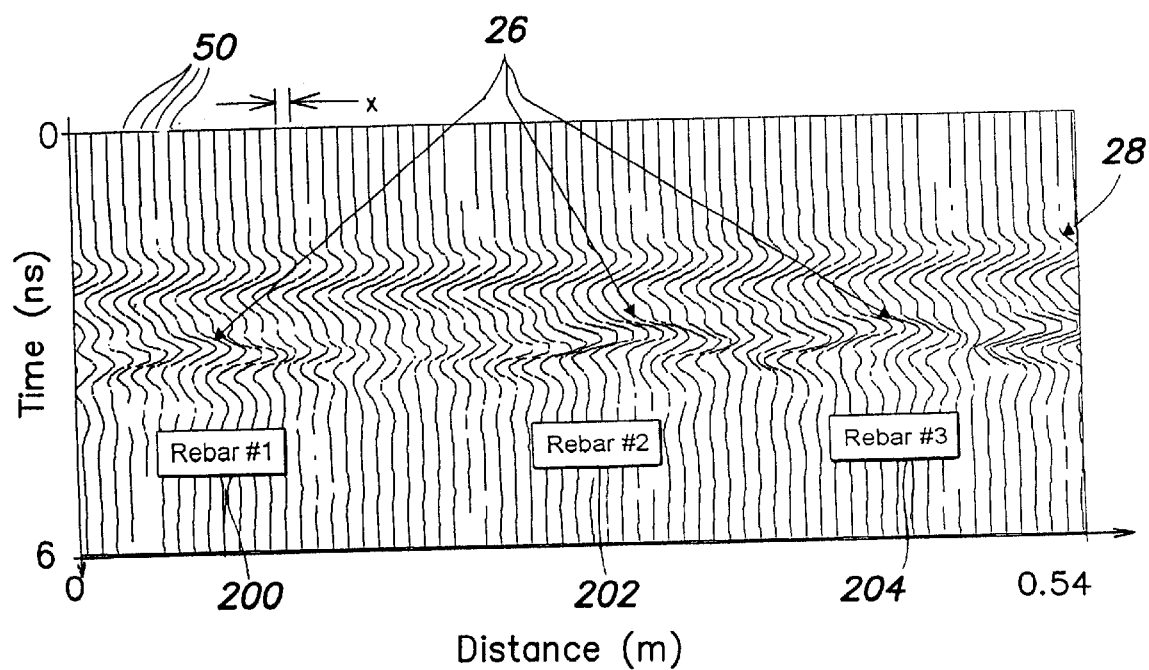
FIG. 6 is a diagram illustrating an embodiment of a graphical representation of the scans of a collection path.

FIG. 6 is a graph illustrating an embodiment of a plurality of detected electromagnetic signals or scans 50 collected along a collection path 17. Such a graph may be referred to herein as a waterfall graph due to the visual impression created by the scans 50. The vertical axis represents time in nanoseconds, and the horizontal axis represents distance along a collection path 17 in meters. This waterfall graph represents a collection of data along a collection path with a scan density of 120 scans/meter, resulting in a scan interval of 0.83 cm (shown as 'x' in FIG. 6). The positions 200, 202, 204 of three transverse rebars 5 relative to the collection path 17 are superimposed on the waterfall graph. FIG. 6 illustrates the concrete surface reflection 28 and the transverse reflections 26 (the asphalt reflection 30 and direct-coupling signal of each scan is not shown) of each scan 50. The transverse rebar reflections 26 corresponding to scans 50 detected from a detection point most directly over the transverse rebar positions 200, 202, 204. The amplitudes of the concrete surface reflections 28 remain essentially constant relative to the position of the scans relative to the rebar positions 200, 202, 204. The amplitudes of the transverse rebar reflections 26, however, increase as a scan approaches the center of a rebar position 220, 202, 204 for the reasons discussed above.

In an embodiment when individual rebars need not be isolated and the detected signals 50 include first detected signals corresponding to first transmitted signals having a first primary electric field polarization and second detected signals corresponding to a second transmitted signals having a second primary electric field polarization (for example, when approximately 1 GHz air-launched antennas are used), the method of determining one or more areas of deterioration may be as follows.

When air-launched antennas are used, it is not possible to resolve individual transverse rebar reflections 26 from the detected signals 50, and in each detected electromagnetic signal 50, the transverse reflections 26 may approximate a constant layer in the data. Analyzing such data may include: (1) locate asphalt reflections 30 and direct-coupling signals in the first and second signals, (2) perform a height adjustment to the first and second signals in accordance with the these locations in the data, (3) subtract a metal-plate-calibration scan from the first and second signals, (4) equalize the amplitudes of the first and second signals using the asphalt reflections, (5) for each pair of first and second signals, subtract the second signal, associated with the transmitted signal have a primary electric field polarization substantially orthogonal to the transverse rebars 5, from the first signal associated with the transmitted signal having an primary electrical field polarization substantially parallel to the transverse rebars 5, and (6) determine the transverse reflections amplitudes resulting from the subtractions.

In an embodiment of analyzing the detected signals, an added step includes adjusting the amplitudes of the transverse reflections 26 to account for the depth of the corresponding transverse rebars 5 in the concrete layer 40. This adjustment may be necessary because the amplitude of a transverse reflection 26 is sensitive to the depth of the rebar in the concrete layer 40. The detected electromagnetic signal 50 may be attenuated during propagation through the concrete layer 40 due to conduction losses, scattering, and spreading losses in both sound concrete and deteriorated concrete. Therefore, the transverse reflections 26 arriving from transverse rebars 5 at greater depths may have lower amplitudes relative to the transverse reflections 5 from shallower transverse rebars 5. This variation in amplitude is independent of the condition of the rebar, and therefore undesired.

Experimental data has shown when the transverse reflection amplitudes, in decibels (dB), are plotted on graph vs. the depth of the corresponding transverse rebar 5 in a sound concrete, that the slope is generally linear. The depth of a transverse rebar 5 is proportionally related to the arrival time of the transverse reflection 26 in the detected signal 50. Thus, to correct the rebar reflection amplitudes, the amplitude of a transverse reflection may be adjusted in accordance with its arrival time. To determine the proper adjustment, the transverse reflection amplitudes may be plotted in decibels (dB) versus arrival time. The slope of the plot in dB/ns may be determined and applied to transverse reflection amplitudes for this "natural" attenuation loss when necessary.

In an exemplary embodiment, an area of a bridge deck 1 may be considered deteriorated "per se" when the transverse reflection amplitude associated with the area has a value 10 to 20 dB lower than the highest transverse reflection amplitudes determined for the bridge deck 1.

The attenuation loss from sound concrete is typically on the order of only a few dB/cm of depth. Therefore, correcting the transverse rebar amplitudes is not critical unless the depths of the transverse rebars 5 vary by more than 2 or 3 centimeters.

Figure 15:
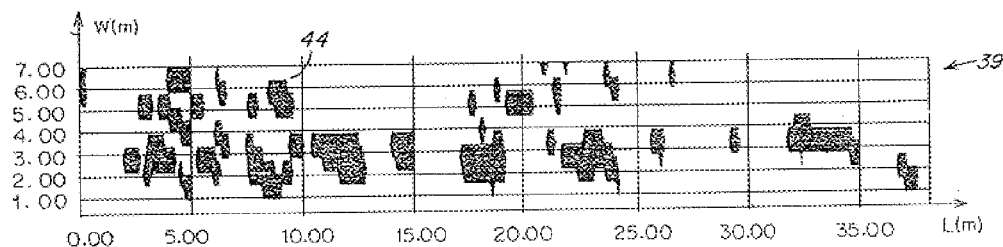
FIG. 15 is a two-dimensional graph illustrating the presence or lack thereof of deteriorated areas within a concrete structure along a length and width of the concrete structure.

After correcting the reflection amplitudes for arrival time variations (if necessary), a visual representation may be generated from the determined amplitudes, each amplitude corresponding to an area on the surface of the bridge deck 1. In a two-dimensional representation, the amplitude may be represented as a color or grayscale value. FIG. 15 is an embodiment of such a two-dimensional representation, and will be discussed in more detail below. In a three-dimensional representation, each amplitude may be represented as a distance along a third axis.

An exemplary embodiment of a method of analyzing the data to determine the extent of one or more areas of deterioration will now be described in more detail.

FIGS. 10A–10D and 12A–12D are graphs illustrating an embodiment of determining the extent of deterioration of one or more areas of a concrete bridge deck 1 along a collection path 17, where the concrete bridge deck 1 includes an asphalt layer 10. FIGS. 10A–D correspond to data corresponding to signals 20 transmitted at a center frequency of about 1.5 GHz from a ground-coupled antenna, and FIGS. 12A–D correspond to signals 20 transmitted at a center frequency of about 1 GHz from one or more air-launched antennas. In each figure, the vertical axis, from top to bottom, represents a duration of detection in nanoseconds, and each horizontal axis, from left to right, represents distance along the collection path. In FIGS. 10A–10D the length along the collection path 17 represented by the horizontal axis is approximately 6 m, and in FIGS. 12A–12D the length represented is approximately 16 meters.

Each graph represents a plurality of scans detected at detection points along the collection path 17 resulting from the transmission of a pulse. The density of scans relative to the length of the horizontal axis makes visual recognition of the individual scans virtually impossible. The amplitude along each scan is represented in grayscale, where a scan is brighter for an increase in positive amplitude and dimmer for a decrease in negative amplitude.

In an embodiment, each detected signal 50 is digitized to produce a data signal representing the detected signal 50 as a sequence of signal samples having discrete values.

Figure 7:
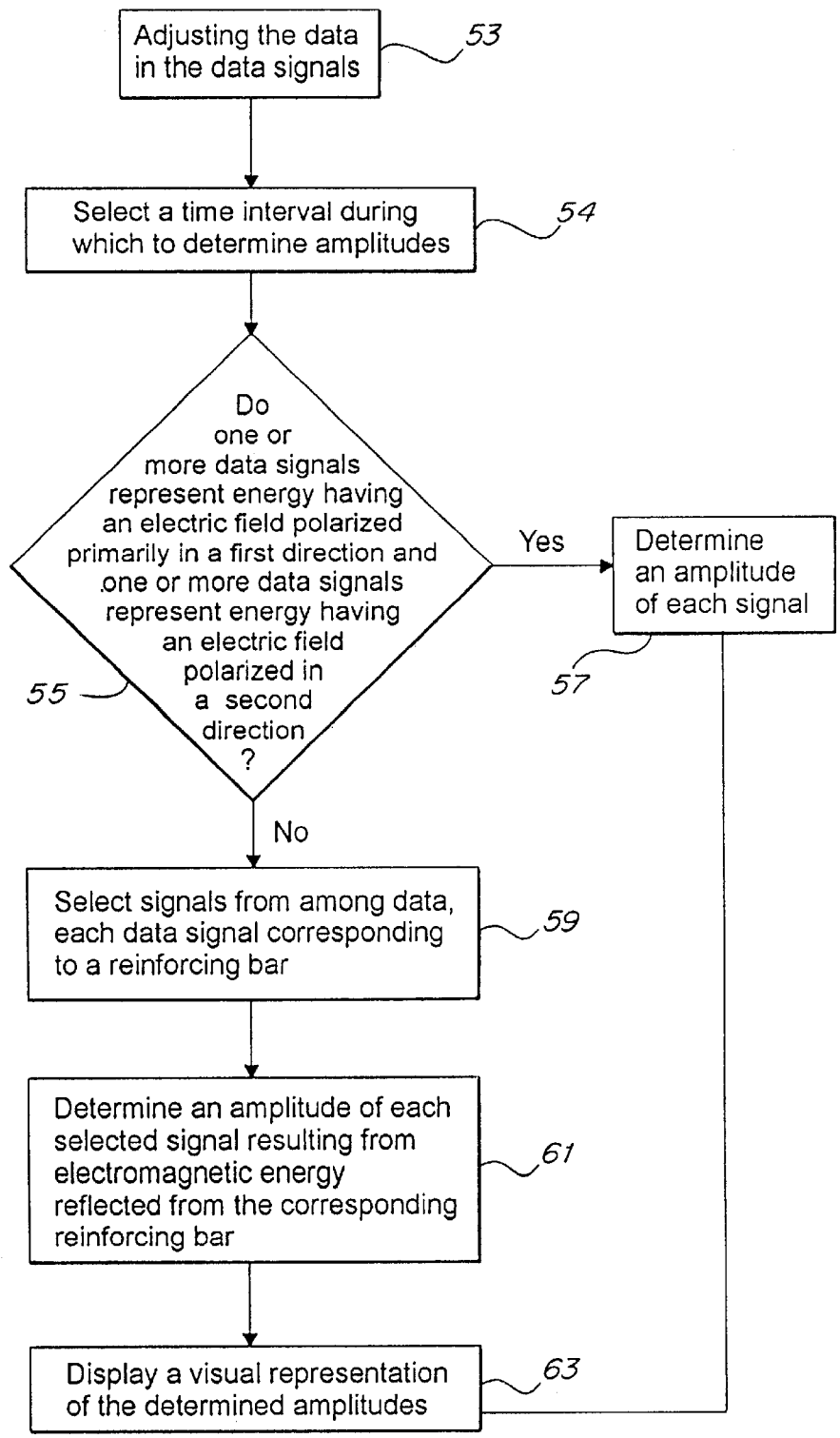
FIG. 7 is a flow chart illustrating an embodiment of a method of determining the extent of deterioration of one or more areas of a concrete structure.

FIG. 7 is a flow chart illustrating an embodiment of a method of determining the extent of deterioration for one or more areas of a concrete structure. In step 53, the data from each data signal is adjusted.

Figure 8A:
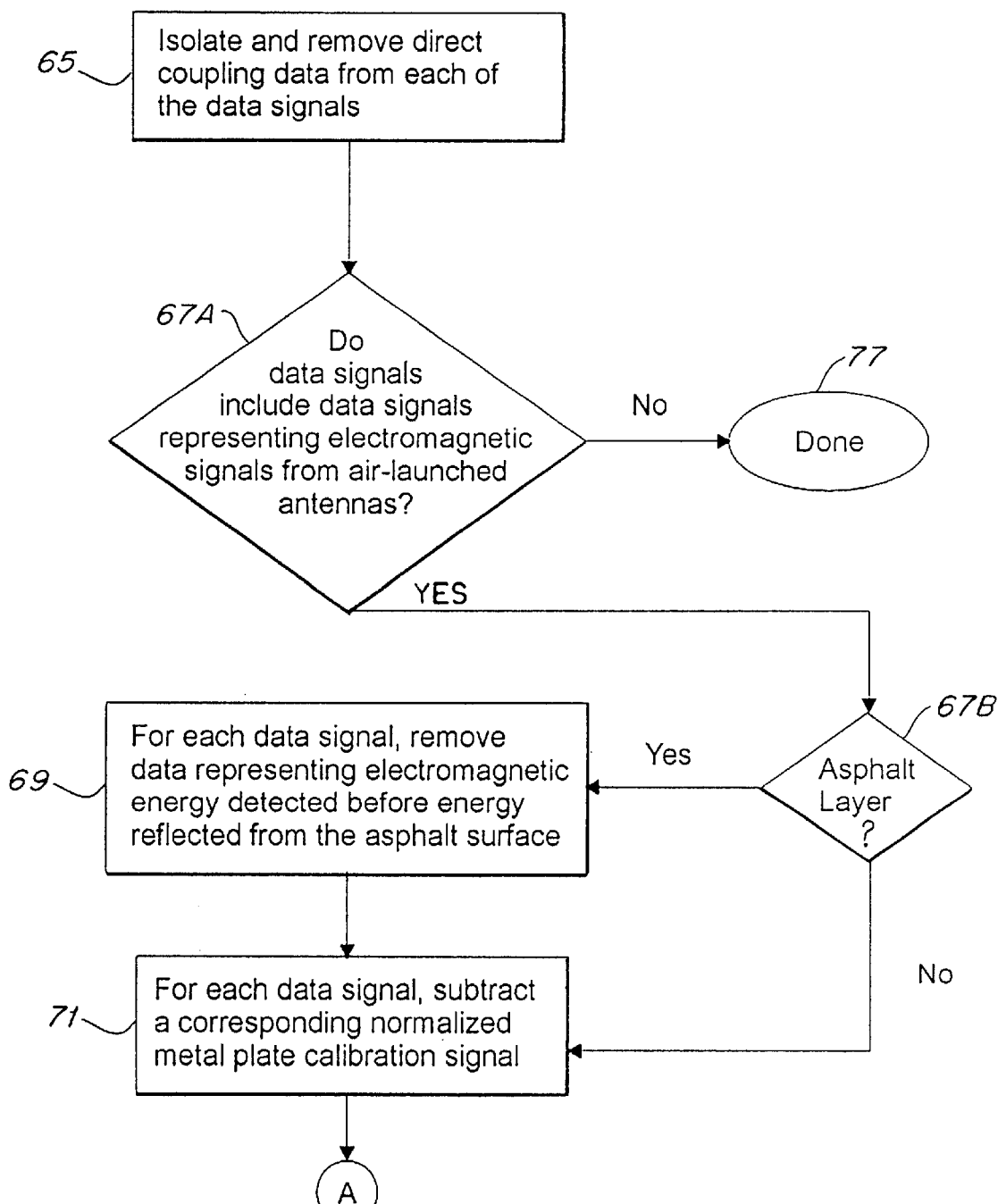
FIGS. 8A–8B are a flow chart illustrating an embodiment of removing data representing electronic energy not reflected from a concrete structure from data signals.
Figure 8B:
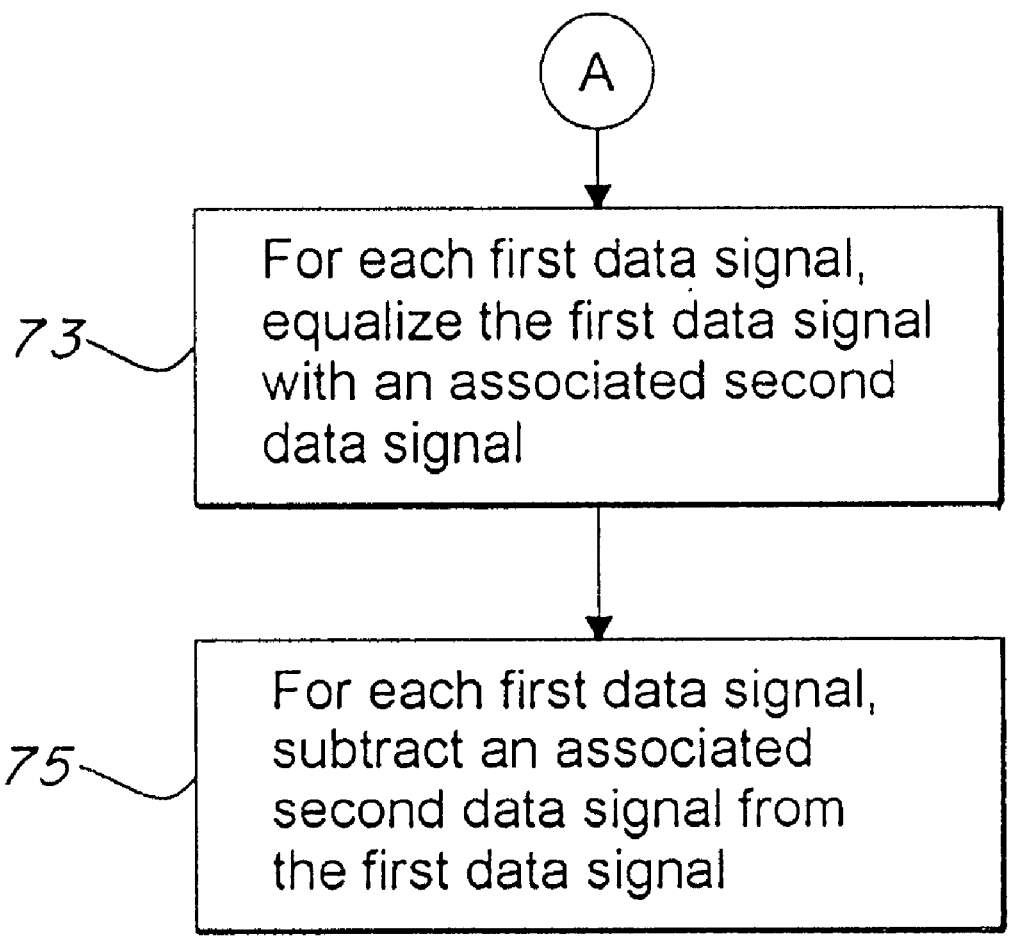

FIG. 8a is a flow chart illustrating an embodiment of step 53. In the first step 65, direct coupling data may be isolated and removed from each of the data signals. For data collected from ground-coupled antennas, such direct coupling data would include the direct-coupled signal and the asphalt reflections 30 (unless no asphalt layer 10 is present). The removal of the direct coupling signal is illustrated by the transition between FIGS. 10A and 10B. For data transmitted and detected from air-launched antennas, the direct coupling data would include just the direct-coupling signal. The result of the removal of the direct coupling signal is illustrated by the transition between FIGS. 12A–B.

In step 67A, it may be determined whether the data signals include first and second data signals representing electromagnetic signals from air-launched antennas as opposed to data representing electromagnetic signals from ground coupling antennas. If it is determined in step 67A that the data does include data from air launched antennas then the step of adjusting the data is complete 77.

If it is determined in step 67A that the data signals do include first and second data signals representing air launched antennas, then in step 67B, it may be determined whether an asphalt layer 10 is overlaid on top of the bridge deck. If there is an asphalt layer 10, then in step 69 data representing electromagnetic energy detected before the asphalt surface reflection 30 may be removed from each signal. In other words, each data signal may be adjusted for the height of the air launched antenna above the surface of the asphalt layer. When the data signals do include data signals representing air launched antennas, steps 69 and 65 may be combined.

If there is not an asphalt layer 10, or after step 69, the process may proceed to step 71. In step 71, a corresponding metal plate calibration signal may be subtracted from each data signal. This subtraction may be necessary to remove some of the antenna ring down (different polarized antennas pairs have different ringing characteristics) and to improve resolution of the features immediately beneath the asphalt surface. The increased resolution becomes more important where there is a thin asphalt layer 10 or no asphalt layer 10 at all above the concrete bridge deck 1. If the data signals are from air launched antennas, the result of removing the direct-coupling signal, adjusting the signal for the height, and applying the metal plate calibration subtraction is illustrated by the transition between FIGS. 12A–B.

Next, in step 73, each first data signal corresponding to a signal 20 transmitted from the parallel-aligned antenna pair may be equalized with an associated second data signal corresponding a signal 20 transmitted from the orthogonally-aligned antenna pair. Equalizing the two data signals may be necessary to negate the possible electrical differences between the two antenna pairs. For example, the first antenna pair may have slightly different electrical component characteristics than the second antenna pair resulting in a slightly more powerful electromagnetic signal being transmitted or received. The signals may be equalized by comparing the normalized amplitudes of asphalt reflections 30 or concrete surface reflections 28 (particularly if there is no asphalt layer 10) from the first and second signals. Using the amplitudes of the asphalt reflection 30 is preferable because, barring differences between the electrical properties of the antenna pairs, these amplitudes should be equal, whereas due to possible deterioration of the concrete surface 3, the amplitude of the concrete surface reflection 28 may be less reliable.

Figure 12A:
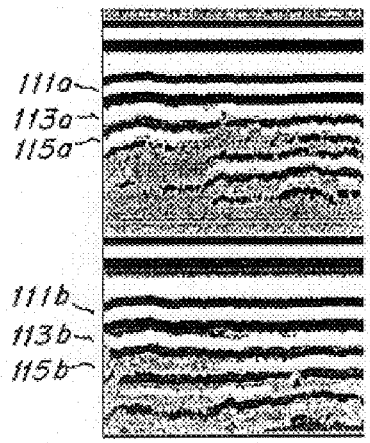
FIGS. 12A–12D are graphical representations of data signals representing electromagnetic signals detected along a length of a concrete structure illustrating an embodiment of a method for determining the extent of deterioration for one or more areas of a concrete structure.
Figure 12B:
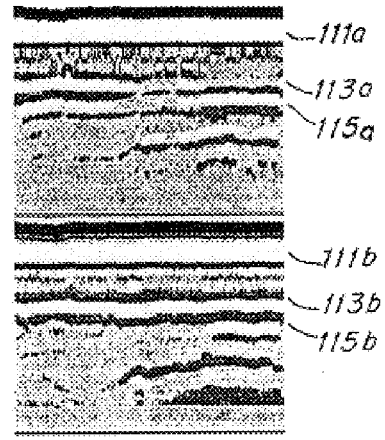
Figure 12C:
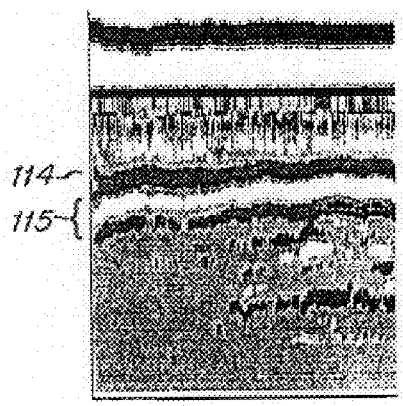
Figure 12D:
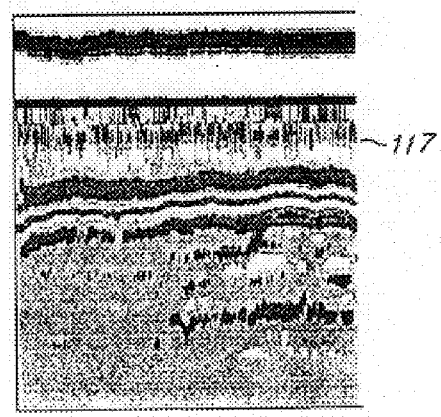

Next, in step 75, for each first data signal, an associated second data signal may be subtracted from the first data signal to produce a third signal. The results of this subtraction are illustrated by the transition from FIG. 12B to FIG. 12C. Specifically, for each elemental time interval, a value for this interval from the second signal is subtracted from a value for this interval from the first signal. As can be seen in FIG. 12C, the subtraction operation removes data common to both data signals resulting in improved resolution of the transverse reflection of the third signals.

Returning to FIG. 7, after the completion of step 53, in the next step 54, a time interval during which to select transverse reflections 26 is selected. FIG. 10C illustrates the time interval to be selected from data resulting from a signal 20 transmitted from a ground-coupled antenna, which may be referred to herein as ground-coupled data. FIG. 12C illustrates a time interval to be selected from a signal 20 transmitted from an air-launched antenna, which may be referred to herein as air-launched data. As discussed above, the vertical axis of FIGS. 10C and 12C represents the value of each detected signal 50 over a period of nanoseconds, going from top to bottom. In FIG. 10C, the bright hyperbolic peaks within the time period 107 represent the transverse reflection amplitudes, which all occur after a point in time 106. Thus, a selected time interval should be within the period of time after point 106. In an embodiment, a different period of time may be chosen for one or more detected signals 50.

Similarly, in FIG. 12C, the transverse reflection amplitudes 115 all occur after a point in time 114. Thus, a selected time interval should be within the period of time after point 114. In an embodiment, a different period of time may be chosen for one or more detected signals 50.

The time interval may be selected semi-automatically by displaying each detected signal on a display device and providing a user interface to allow a user to select a time interval for one or more data signals from which to select amplitudes. User interfaces are discussed in more detail below. Alternatively, if the velocity of the transmitted and reflected signals in the concrete layer 40, and the asphalt layer 10 present, may be determined, the time intervals may be automatically chosen to coincide to when the transverse reflections are detected. Determining the velocity of an electromagnetic signal in a concrete layer 40 of a bridge deck 1 is described in the Roberts Application.

Next, in step 55, it is determined whether the data signals include first and second data signals representing electromagnetic signals from air-launched antennas as opposed to data representing electromagnetic signals from ground-coupled antennas. In other words, in step 55, it is determined whether the data represents electromagnetic energy transmitted and received from two pairs of antennas, for example, two pairs of air-launched horn antennas, or whether the data represents electromagnetic energy transmitted and received from a single pair of antennas such as, for example, two dipole-like antennas, in close proximity to the bridge surface.

Figure 13:
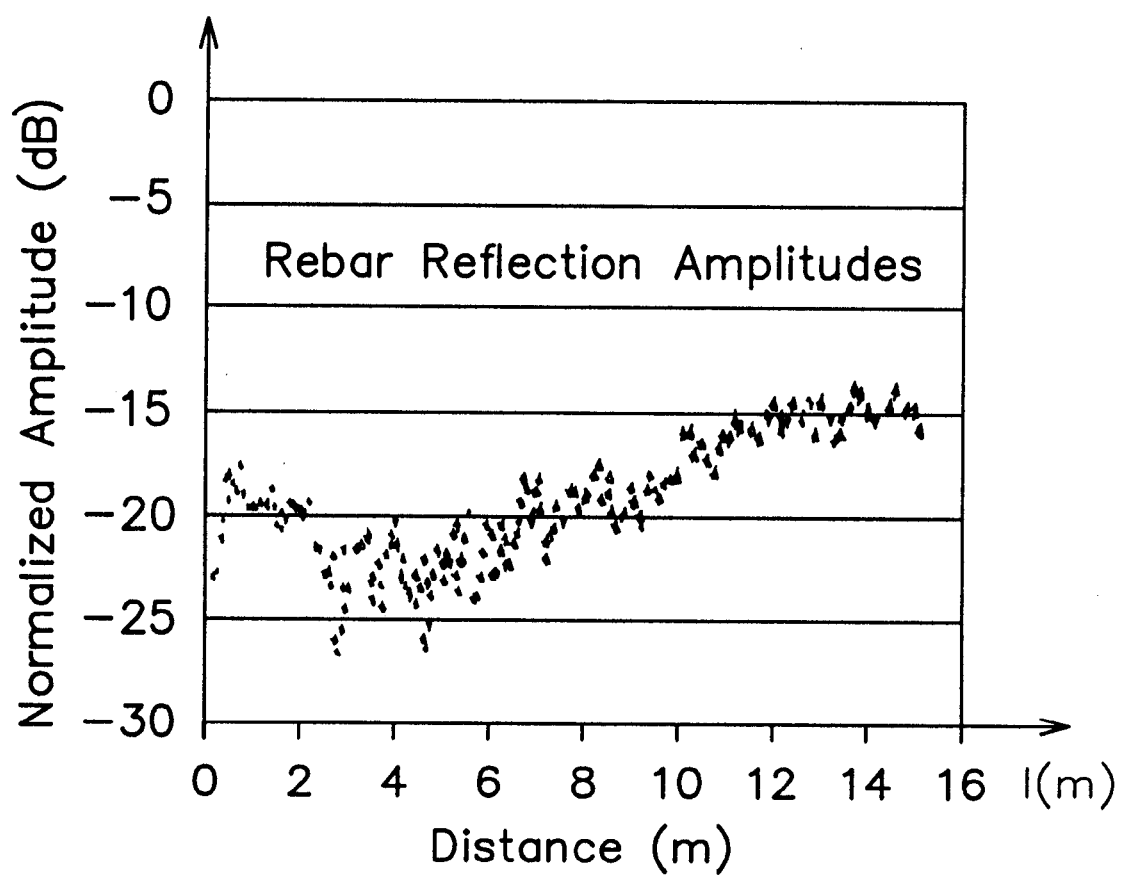
FIG. 13 is a graph illustrating amplitudes of data signals corresponding to electromagnetic energy reflected from rebars of a concrete structure along a length of the concrete structure.

If it is determined in step 55 that the data signals do include first and second electromagnetic signals from air-launched antennas, then in step 57, the amplitude of each data signal may be determined by selecting the peak amplitude from the selected time interval. This selection may be done automatically by comparing the amplitude for each discrete interval of the data signal within the selected time interval, and selecting the amplitude with the highest value. FIG. 13 illustrates the transverse reflection amplitudes that may be determined from the air-launched data of FIGS. 12A–12D.

If it is determined in step 55 that the data signals do not include first and second electromagnetic signals from air-launched antennas, then in step 59 signals are selected from among the data signals, wherein each selected signal corresponds to a reinforcing bar.

Figure 9:
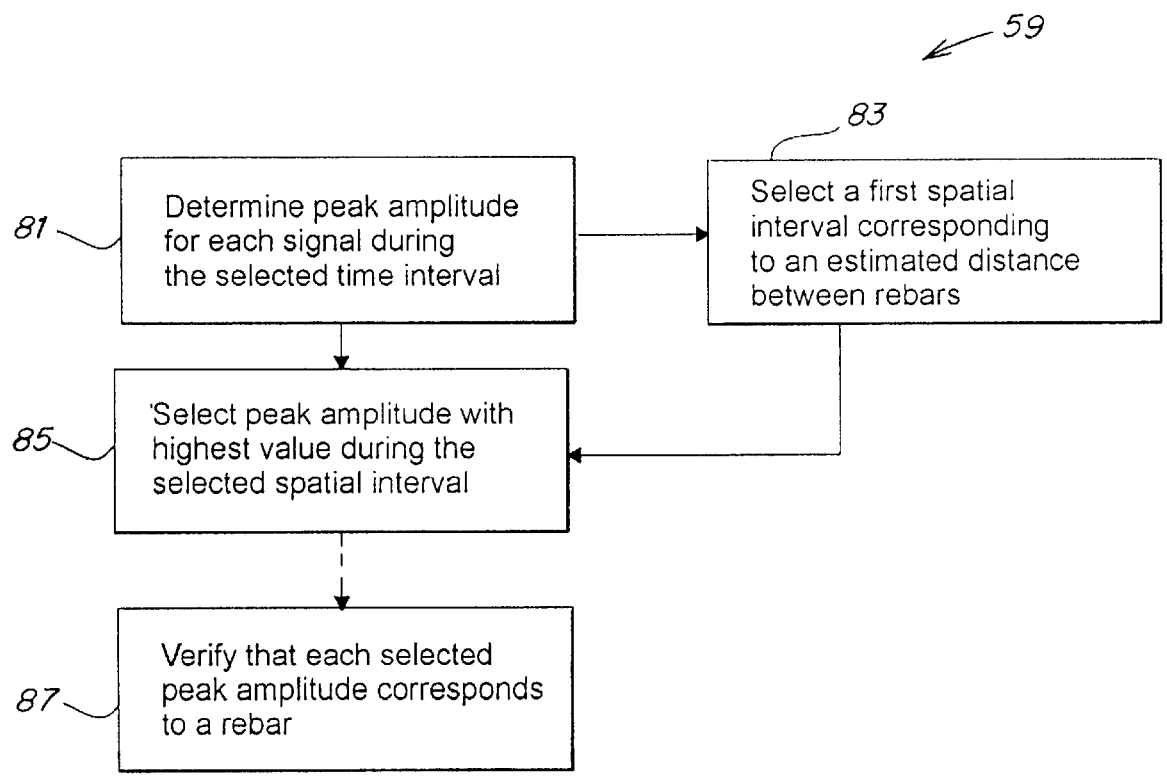
FIG. 9 is a flow chart illustrating an embodiment of a method of selecting data signals from data signals corresponding to reinforcing bars of a concrete structure.

FIG. 9 is a flow chart illustrating an example embodiment of step 59. First, in step 81, the peak amplitude for each signal during the selected time interval is determined as described in step 57. Next in step 83, a first spatial interval is selected corresponding to an estimated distance between transverse rebars 5. For example, this first spatial interval may be chosen to be 29.5 cm. This first spatial interval may be preprogrammed or dynamically selected using a user-interface.

Figure 11:
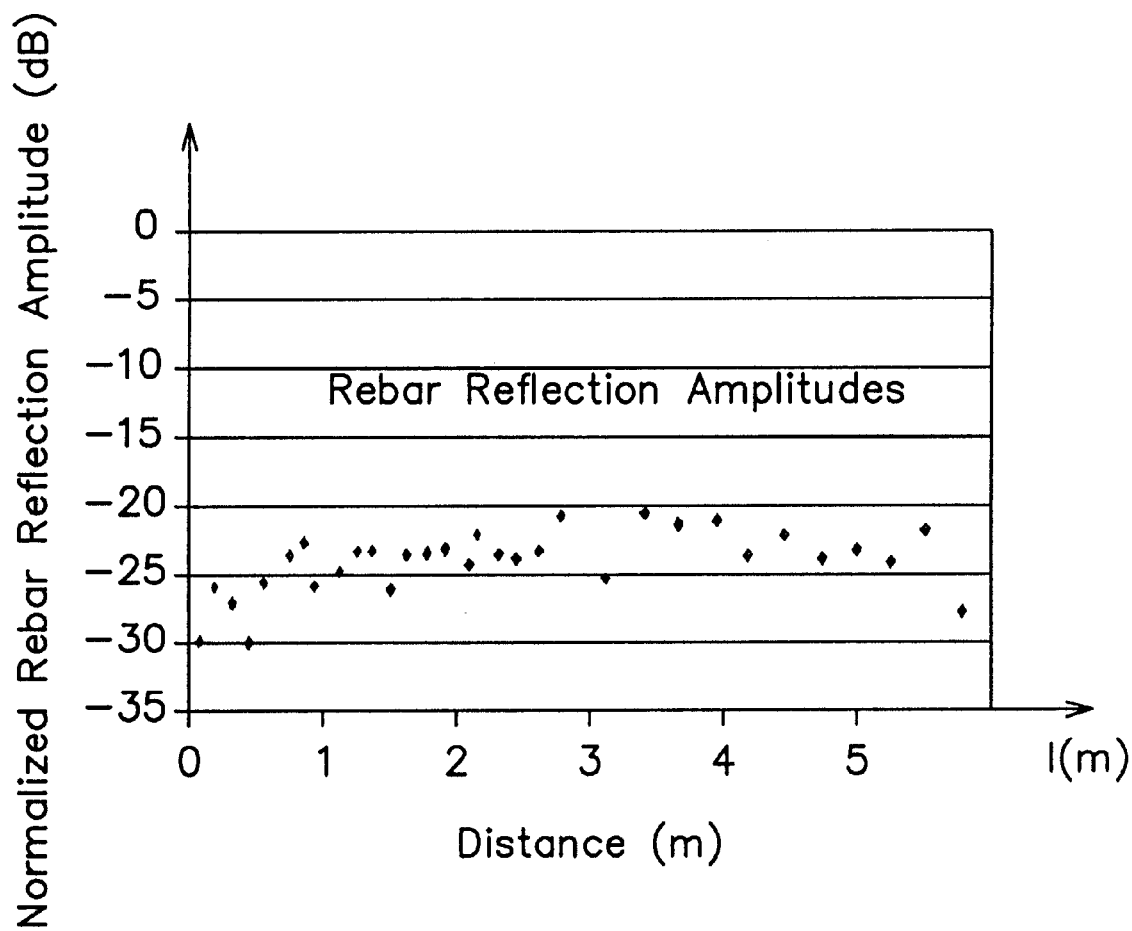
FIG. 11 is a graph illustrating amplitudes of data signals corresponding to electromagnetic energy reflected from rebars of a concrete structure along a length of the concrete structure.

Next, in step 85, it is determined which peak amplitude, determined for the selected time interval, has the highest value for the first spatial interval. In step 87, it may be verified that the peak amplitude determined to have the highest value corresponds to a transverse rebar 5. This verification may be done semi-automatically by visually inspecting a graphical rendering of the scans of a collection path such as, for example FIGS. 10B and 10C. By inspecting a graphical rendering, a user can determine whether the selected peak amplitudes correspond to the visual data such as, for example, the bright hyperbolic peaks 107. FIG. 11 illustrates the transverse reflection amplitudes, and their locations, that may be determined from the ground-coupled data of FIGS. 10A–10D.

The selected peak amplitudes may be incorrect if one or more of the transverse rebars 5 are inadequately spaced significantly less than 10 cm apart, or spaced an extreme distance apart. This causes either less than the total number of transverse rebars 5 to be selected or more than the number of transverse rebars 5 to be selected, respectively. Inadequate spacing may also cause interference between transverse reflections 26 leading to incorrect determinations of transverse reflection amplitudes.

Further, the selected peak amplitudes may be incorrect when one or more transverse rebars 5 are more shallow or deeper in the concrete layer 40 by more than about 2 cm than an adjacent transverse rebar 5. This difference in depth may cause the transverse reflections 5 to arrive early or late, respectively, or have a greater or lesser amplitude, respectively. The arrival times of the adjacent rebars may overlap causing interference between transverse reflections 26, and leading to incorrect determinations of transverse reflection amplitudes. This may cause the incorrect peak amplitude to be chosen.

Visually inspecting a graphical rendition of the detected signals allows a user to recognize the approximate distance between transverse reflections, and adjust the spatial interval used to select peak amplitudes accordingly, and to recognize a skewed reflection pattern possibly caused by inadequate spacing between transverse rebars or a significant difference in depth between adjacent rebars. A user then may manually select or deselect detected signals 50 using a user interface.

In an embodiment, the spatial interval used for selection may be reprogrammed and the entire detecting process repeated until visual inspection verifies that a certain number of selected signals, ideally all of them, are correct.

In another embodiment of verifying data, a highest value of all peak reflection amplitudes within a spatial interval may be determined, and then all peak reflection amplitudes that do not have a value within a minimum range, for example, 6 dB, are discarded. These results may then be compared to the results from selecting just highest value peak amplitudes, and spurious selected reflection amplitudes may be de-selected, and missed reflection amplitudes selected.

In an embodiment, a user may migrate the data signals of a collection path to assist in visually inspecting data and selecting time and spatial intervals. Data migration is a well-known imaging technique used in the field of geophysics for processing of seismic reflection data. Data migration assists a user in analyzing a visual representation of data, by performing a function on each element of data that uses neighboring data to alter each data element. For example, data migration may be used to help identify the transverse reflection amplitudes in the graphical rendering of FIG. 10B. FIG. 10C is the graphical rendering of the result of performing migration on the data of FIG. 10B. As can be seen, data migration more precisely defines the hyperbolic transverse reflection amplitudes of FIG. 10B in the interval 107.

Figure 14:
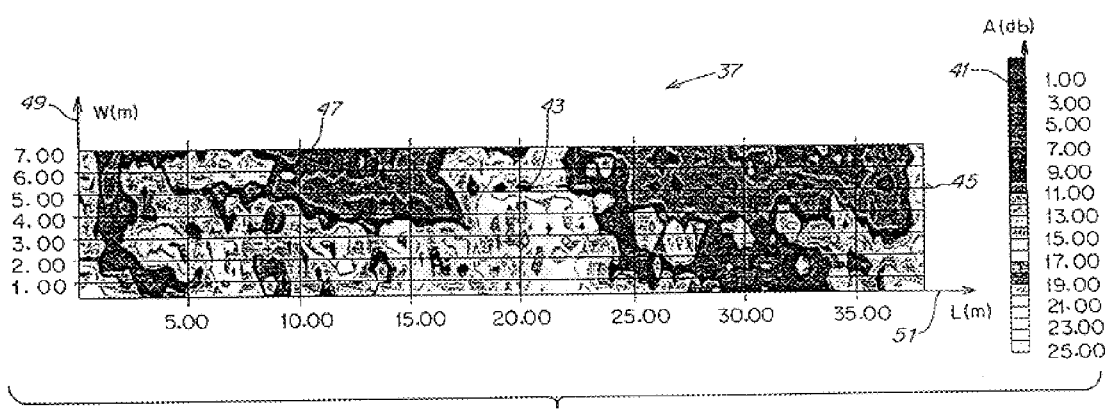
FIG. 14 is a graph illustrating a two-dimensional representation of the extent of deterioration within a concrete structure along a width and length of the concrete structure.

Returning to FIG. 7, in step 63, a visual representation of the determined amplitudes may be displayed. FIG. 14 is an example embodiment of a two-dimension contour map 37 of a surface of a bridge deck. The vertical axis 49 may represent the transverse direction 18 and the horizontal axis 51 may represent the longitudinal direction 16. The grayscale value of each position (e.g., 43, 45 and 47) may represent the extent of deterioration in that position, where the brightness of the grayscale value is correlative to the strength of the transverse reflection amplitude detected at this position of the surface of the bridge deck 1. The granularity or resolution of the grayscale 41 may be selected by a user. In an embodiment, a threshold value defined for deterioration based on the transverse reflection amplitudes could yield a two-tone image.

In an embodiment, the contour map may be a three-dimensional representation with each transverse reflection value being represented as a distance along a third dimension. A graphical representation of the surface of the bridge may be produced by a computer system as discussed below in more detail.

FIG. 15 is a two-dimensional graph 39 produced using the hammer-sounding technique on the same bridge deck that produced the contour map 37 of FIG. 14, where each blackened area, for example 44, corresponds to areas of the bridge deck determined to be deteriorated. As can be seen, contour map 37 is a far more detailed representation of the condition of the bridge deck.

Figure 16:
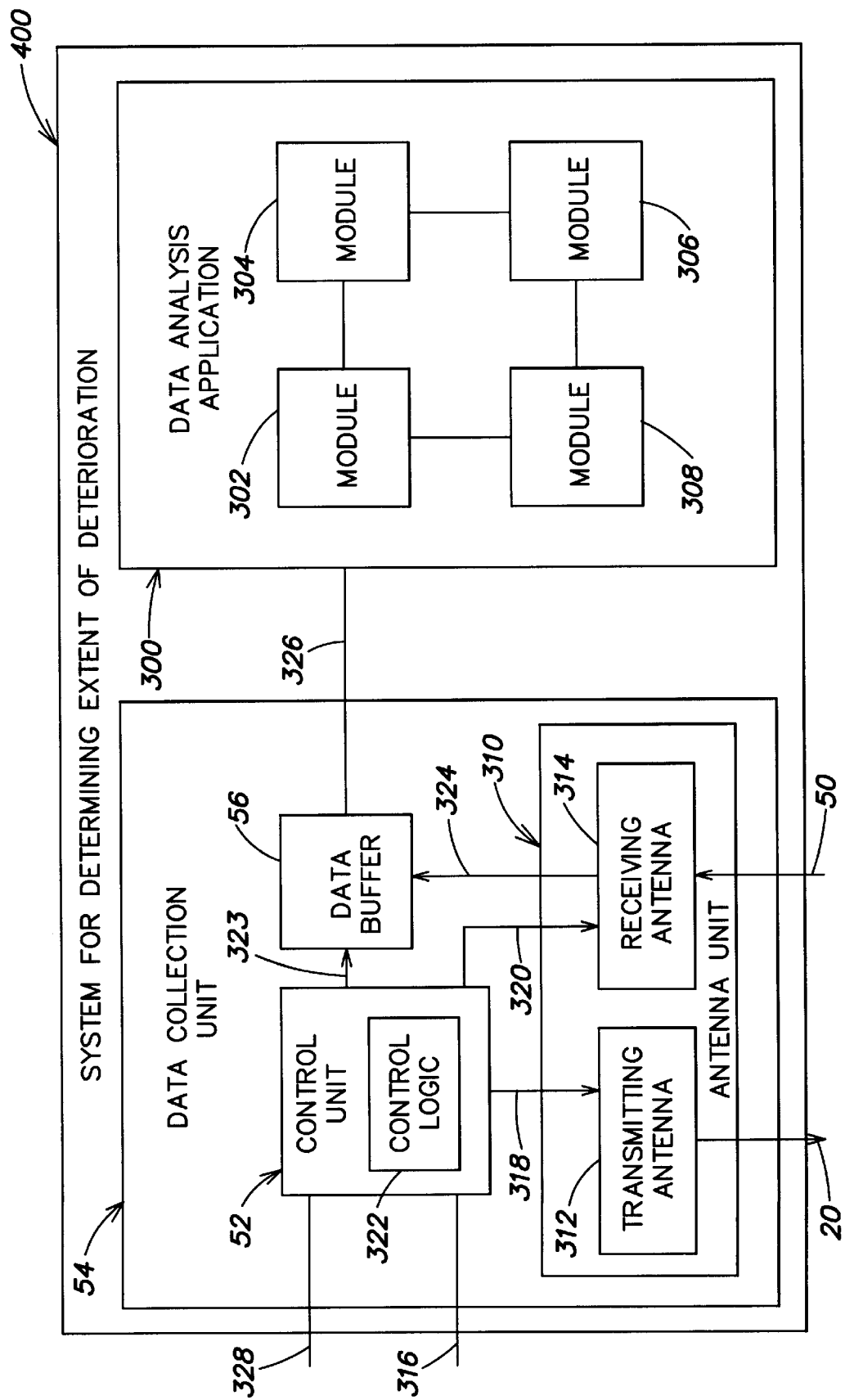
FIG. 16 illustrates an embodiment of a system for determining the extent of deterioration of one or more areas of determination.

FIG. 16 illustrates an embodiment of a system 400 for determining the extent of deterioration of one or more areas of determination, including a data collection unit 54 and a data analysis application 300. The data collection unit 54 may include a control unit 52 connected to an antenna unit 310, and a data buffer 56. The antenna unit may include a transmitting antenna 312 that transmits electromagnetic signals 20 and a receiving antenna 314 that detects electromagnetic signals 50. In an embodiment using two orthogonally-aligned antenna pairs, as discussed above, more than one antenna unit may be included in the data collection module, the control of which may be analogous to the description of the control of the antenna unit 310 discussed below.

The control unit 52 may receive a position signal 316 that indicates a position on the surface of a bridge deck 1, or a position along a detection path 17. Such a position signal may be received from a position determination device (not shown) that may determine position using one of the techniques described above or other known techniques. The control unit 52 may contain control logic 322 to assert a first control signal 318 to the transmitting antenna 312 to trigger the transmitting antenna 312 to transmit signals 20 depending on the position signal 316, and to assert a second control signal 320 to the receiving antenna 314 antenna to trigger the receiving antenna to detect signals 50 depending on the position signal 316. The control logic 322 may de-assert the control signal 318 to stop the transmitting antenna 312 from transmitting in accordance with the position signal 316, and de-assert the second control signal 320 to stop the receiving antenna 314 from detecting in accordance with the position signal 316.

The receiving antenna 314 may output detected signals 50 on a first signal carrier 324 such as, for example, a wire or a data bus, to the data buffer 56. The data buffer 56 may be a recording medium as discussed above, and particularly may be a computer-readable storage medium of a variety of types discussed below. The data buffer 56 may temporarily store a plurality of detected signals 50, the number of stored signals depending on the capacity of the data buffer 56 and other well-known efficiency considerations. For example, the data buffer may store an entire collection path 17 of detected signals 50.

The control unit 52 may assert a third control signal 323 to control the reception of detected signals by the data buffer 56 along the first signal carrier 324, and to control the transfer of the stored detected signals along a second signal carrier 326 to the data analysis application 300.

The control unit 52 may have a second input 328 to receive data collection parameters. Such parameters may include: the duration of each transmitted signal 20, the scan interval, the duration of each detected signal 50, the number of scans per collection path 17 (or the length of the collection path 17), the number of bits to use in the data buffer 56 to store a given value if the data buffer 56 is a digital recording medium, and various parameters for the control of the antennas. Such parameters may be programmed into the control unit 54 or may be received from a user input device such as described below.

The data collection unit 54 may also include an analog-to-digital converter (A/D converter) to convert the analog detected signals 50 to digital signals before being stored in the data buffer 56 or before being sent to the data analysis application 300. Alternatively, the A/D converter may be part of a computer system accessed by the data analysis application 300, examples of which are discussed below in more detail.

The data analysis application 300 may include a plurality of interconnected modules 302–308 to implement the processing steps described above in connection with FIGS. 7–9.

The data analysis application may be implemented with a typical computer system. The invention is not limited to any specific computer described herein. Many other different machines may be used to implement the data analysis module. Such a suitable computer system includes a processing unit which performs a variety of functions and a manner well-known in the art in response to instructions provided from an application program. The processing unit functions according to a program known as the operating system, of which many types are known in the art. The steps of an application program are typically provided in random access memory (RAM) in machine-readable form because programs are typically stored on a non-volatile memory, such as a hard disk or floppy disk. After a user selects an application program, it is loaded from the hard disk to the RAM, and the processing unit proceeds through the sequence of instructions of the application program.

The computer system also includes a user input/output (I/O) interface. The user interface typically includes a display apparatus (not shown), such as a cathode-ray-tube (CRT) display in an input device (not shown), such as a keyboard or mouse. A variety of other known input and output devices may be used, such as speech generation and recognition units, audio output devices, etc.

The computer system also includes a video and audio data I/O subsystem. Such a subsystem is well-known in the art and the present invention is not limited to the specific subsystem described herein. The audio portion of the subsystem includes an analog-to-digital (A/D) converter (not shown), which receives analog audio information and converts it to digital information. The digital information may be compressed using known compression systems, for storage on the hard disk to use at another time. A typical video portion of subsystem includes a video image compressor/decompressor (not shown) of which many are known in the art. Such compressor/decompressors convert analog video information into compressed digital information. The compressed digital information may be stored on hard disk for use at a later time.

One or more output devices may be connected to the computer system implementing the data analysis application. Example output devices include a cathode ray tube (CRT) display, liquid crystal displays (LCD) and other video output devices, printers, communication devices such as a modem, storage devices such as disk or tape, and audio output. One or more input devices may be connected to the computer system. Example input devices include a keyboard, keypad, track ball, mouse, pen and tablet, communication device, and data input devices such as audio and video capture devices and sensors. The computer system is not limited to the particular input or output devices used in combination with the computer system or to those described herein.

The data analysis application may be implemented on a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, such as the series x86 and Pentium processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows95 or 98, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, for example, a floppy disk or a read/write CD, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

The data analysis application is not limited to a particular computer platform, particular processor, or particular programming language. Additionally, the computer system may be a multi-processor computer system or may include multiple computers connected over a computer network. The steps described in FIGS. 7–9 may be separate modules of a computer program, or may be separate computer programs. Such modules may be operable on separate computers.

Having now described some illustrative embodiments, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method steps or apparatus elements, it should be understood that those steps and those elements may be combined in other ways to accomplish the same objectives. Steps, elements and features discussed only in connection with one embodiment are not intended to be excluded from a similar role in other embodiments.

What is claimed is:

1. A method of determining a condition of a substantially concrete structure, the method comprising:

receiving one or more computer-readable data signals, wherein each data signal represents an electromagnetic signal detected from an area of the concrete structure, and wherein one or more of the detected electromagnetic signals include electromagnetic energy reflected from the concrete structure as a result of an electromagnetic signal transmitted into the concrete structure; and determining from the one or more computer-readable data signals an extent of deterioration of one or more areas of the substantially concrete structure.

2. The method of claim 1, wherein the step of determining includes:

selecting one or more of the data signals;

determining an amplitude of each selected data signal; and determining the extent of deterioration of the one or more areas from the determined amplitudes.

3. The method of claim 2, wherein the substantially concrete structure contains one or more reinforcing bars, and each selected data signal corresponds to one of the one or more reinforcing bars, and wherein the determined amplitude of each selected signal is an amplitude resulting from electromagnetic energy reflected from the corresponding reinforcing bar.

4. The method of claim 3, wherein the substantially concrete structure has a first side, each transmitted electromagnetic signal having been transmitted at a different position along the first side of the concrete structure, wherein each data signal represents an electromagnetic signal collected over a period of time, the method further comprising:

for each data signal, selecting a time interval of the data signal during which the electromagnetic energy reflected from the corresponding reinforcing bar was detected; and for each data signal, determining a peak amplitude of the data signal during the selected time interval, wherein determining an amplitude includes, for one or more spatial intervals of a first length along the first side of the substantially concrete structure, selecting a data wherein determining an amplitude includes, for one or more spatial intervals of a first length along the first side of the substantially concrete structure, selecting a data signal with a peak amplitude of a highest magnitude from among data signals corresponding to electromagnetic signals transmitted within the spatial interval.

5. The method of claim 4, further comprising:

migrating the data signals to facilitate selecting the data signal with a peak amplitude of the highest magnitude.

6. The method of claim 2, wherein the substantially concrete structure has a first side from which the transmitted and detected electromagnetic signals are transmitted and detected, respectively, and wherein determining the extent of deterioration of the one or more areas from the determined amplitudes:

for each determined amplitude, adjusting the determined amplitude to accommodate for attenuation of the selected signal due to a distance of the corresponding reinforcing bar from the first side; and determining the extent of deterioration of the one or more areas from the adjusted amplitudes.

7. The method of claim 2, wherein, for each determined amplitude, the determined amplitude is inversely related to an extent of deterioration of the area of the concrete structure corresponding to the data signal from which the determined amplitude was determined.

8. The method of claim 2, wherein the substantially concrete structure has a first side, and determining the extent of deterioration of the one or more areas from the determined amplitudes includes:

for each determined amplitude, determining a coordinate of the determined amplitude on a two-dimensional representation of the first side;

displaying the two-dimensional representation of the first side of the substantially concrete structure, wherein each determined amplitude is represented at the determined coordinate with a value corresponding to the determined amplitude; and determining the extent of deterioration of the one or more areas by visually inspecting the two-dimensional representation.

9. The method of claim 8, wherein each determined amplitude is represented in the two-dimensional representation as a color or grayscale value.

10. The method of claim 1, wherein the data signals include one or more first data signals corresponding to electromagnetic energy having an electric field polarized primarily in the first direction and one or more second data signals corresponding to electromagnetic energy having an electric field polarized primarily in the second direction substantially orthogonal to the first direction, wherein each first data signal has an associated second data signal detected from substantially a same area as the first data signal, and wherein the step of determining includes:

for each first data signal, subtracting from the first data signal the associated second data signal to produce a third signal; and determining the extent of deterioration of the one or more areas from the third signal.

11. The method of claim 10, wherein the step of determining further includes:

determining an amplitude of each selected signal; and determining the extent of deterioration of the one or more areas from the determined amplitudes.

12. The method of claim 11, wherein the substantially concrete structure contains one or more reinforcing bars, and wherein the determined amplitude of each selected third signal is an amplitude resulting from electromagnetic energy reflected from one or more of the one or more reinforcing bars.

13. The method of claim 12, wherein the substantially concrete structure has a first side, each transmitted electromagnetic signal having been transmitted at a different position along the first side of the concrete structure, wherein each data signal represents an electromagnetic signal collected over a period of time, and wherein, for each third signal, the method further comprises:

selecting a time interval of the third signal during which the electromagnetic energy reflected from the one or more corresponding reinforcing bars was detected; and determining a peak amplitude of the data signal during the selected time interval, wherein the extent of deterioration of the one or more areas is determined from the peak amplitudes.

14. The method of claim 11, wherein the substantially concrete structure has a first side from which the transmitted and detected electromagnetic signals are transmitted and detected, respectively, and wherein the substantially concrete structure contains one or more reinforcing bars, and wherein each determined amplitude corresponds to reflections of electromagnetic energy from one or more of the one or more reinforcing bars, wherein the step of determining the extent of deterioration of one or more areas of the concrete structure from the amplitudes includes:

for each determined amplitude, adjusting the determined amplitude to accommodate for attenuation of the detected signals from which the determined amplitude is determined due to a distance of the one or more corresponding reinforcing bars from the first side; and determining the extent of deterioration of the one or more areas from the adjusted amplitudes.

15. The method of claim 11, wherein, for each determined amplitude, the determined amplitude is inversely related to an extent of deterioration of the area of the concrete structure corresponding to the data signals from which the determined amplitude was determined.

16. The method of claim 11, wherein the substantially concrete structure has a first side, and the step of determining the extent of deterioration of the one or more areas from the determined amplitudes includes:

for each determined amplitude, determining a coordinate of the determined amplitude on a two-dimensional representation of the first side;

displaying the two-dimensional representation of the first side of the substantially concrete structure, wherein each determined amplitude is represented at the determined coordinate with a value corresponding to the determined amplitude; and determining the extent of deterioration of the one or more areas by visually inspecting the two-dimensional representation.

17. The method of claim 16, wherein each determined amplitude is represented in the two-dimensional representation as a color or grayscale value.

18. The method of claim 1, wherein step of determining includes:

removing from each data signal data representing electromagnetic signals not reflected from the substantially concrete structure; and determining from remaining data of the data signals whether one or more areas of deterioration are present within the substantially concrete structure.

19. The method of claim 18, wherein at least a first side of the substantially concrete structure is adjacent to one or more layers of material, and the transmitted signal is transmitted through the one or more layers, and wherein the step of removing includes:

removing, from each data signal, data representing electromagnetic signals reflected from the one or more layers.

20. The method of claim 1, further comprising:

transmitting one or more of the electromagnetic signals into the concrete structure that result in the reflected electromagnetic energy.

21. A system of determining the condition of a substantially concrete structure, the system comprising:

means for receiving one or more computer-readable data signals, wherein each data signal represents an electromagnetic signal detected from an area of the concrete structure, and wherein one or more of the detected electromagnetic signals include electromagnetic energy reflected from the concrete structure as a result of an electromagnetic signal transmitted into the concrete structure; and means for determining from the one or more computer-readable data signals an extent of deterioration of one or more areas of the substantially concrete structure.

22. The system of claim 21, wherein the means for determining includes:

means for selecting one or more of the data signals;

means for determining an amplitude of each selected data signal; and means for determining the extent of deterioration of the one or more areas from the determined amplitudes.

23. The system of claim 22, wherein the substantially concrete structure contains one or more reinforcing bars, and each selected data signal corresponds to one of the one or more reinforcing bars, and wherein the determined amplitude of each selected signal is an amplitude resulting from electromagnetic energy reflected from the corresponding reinforcing bar.

24. The system of claim 23, wherein the substantially concrete structure has a first side, each transmitted electromagnetic signal having been transmitted at a different position along the first side of the concrete structure, wherein each data signal represents an electromagnetic signal collected over a period of time, the system further comprising:

means for selecting, for each data signal, a time interval of the data signal during which the electromagnetic energy reflected from the corresponding reinforcing bar was detected; and means for determining, for each data signal, a peak amplitude of the data signal during the selected time interval, wherein the means for determining an amplitude includes, for one or more spatial intervals of a first length along the first side of the substantially concrete structure, means for selecting a data signal with a peak amplitude of a highest magnitude from among data signals corresponding to electromagnetic signals transmitted within the spatial interval.

25. The system of claim 24, further comprising:

means for migrating the data signals to facilitate selecting the data signal with a peak amplitude of the highest magnitude.

26. The system of claim 22, wherein the substantially concrete structure has a first side from which the transmitted and detected electromagnetic signals are transmitted and detected, respectively, and wherein the means for determining from the amplitudes includes:

means for adjusting, for each determined amplitude, the determined amplitude to accommodate for attenuation of the selected signal due to a distance of the corresponding reinforcing bar from the first side; and means for determining the extent of deterioration of the one or more areas from the adjusted amplitudes.

27. The system of claim 22, wherein, for each determined amplitude, the determined amplitude is inversely related to an extent of deterioration of the area of the concrete structure corresponding to the data signal from which the determined amplitude was determined.

28. The system of claim 22, wherein the substantially concrete structure has a first side, and the means for determining the extent of deterioration of the one or more areas from the determined amplitudes includes:

means for determining, for each determined amplitude, a coordinate of the determined amplitude on a two-dimensional representation of the first side;

means for displaying the two-dimensional representation of the first side of the substantially concrete structure, wherein each determined amplitude is represented at the determined coordinate with a value corresponding to the determined amplitude; and means for determining the extent of deterioration of the one or more areas by visually inspecting the two-dimensional representation.

29. The system of claim 28, wherein each determined amplitude is represented in the two-dimensional representation as a color or grayscale value.

30. The system of claim 21, wherein the data signals include one or more first data signals corresponding to electromagnetic energy having an electric field polarized primarily in the first direction and one or more second data signals corresponding to electromagnetic energy having an electric field polarized primarily in the second direction substantially orthogonal to the first direction, wherein each first data signal has an associated second data signal detected from a same area as the first data signal, and wherein the means for determining includes:

means for subtracting, for each first data signal, from the first data signal the associated second data signal to produce a third signal; and means for determining the extent of deterioration of the one or more areas from the third signal.

31. The system of claim 30, wherein the means for determining further includes:

means for determining an amplitude of each selected signal; and means for determining the extent of deterioration of the one or more areas from the determined amplitudes.

32. The system of claim 31, wherein the substantially concrete structure contains one or more reinforcing bars, and wherein the determined amplitude of each selected third signal is an amplitude resulting from electromagnetic energy reflected from one or more of the one or more reinforcing bars.

33. The system of claim 32, wherein the substantially concrete structure has a first side, each transmitted electromagnetic signal having been transmitted at a different position along the first side of the concrete structure, wherein each data signal represents an electromagnetic signal collected over a period of time, and wherein, for each third signal, the system further comprises:

means for selecting a time interval of the third signal during which the electromagnetic energy reflected from the one or more corresponding reinforcing bars was detected; and means for determining a peak amplitude of the data signal during the selected time interval, wherein the extent of deterioration of the one or more areas is determined from the peak amplitudes.

34. The system of claim 31, wherein the substantially concrete structure has a first side from which the transmitted and detected electromagnetic signals are transmitted and detected, respectively, and wherein the means for determining from the amplitudes includes:

means for adjusting, for each determined amplitude, the determined amplitude to accommodate for attenuation of the detected signals from which the determined amplitude is determined due to a distance of the corresponding reinforcing bar from the first side; and means for determining the extent of deterioration of the one or more areas from the adjusted amplitudes.

35. The system of claim 31, wherein, for each determined amplitude, the determined amplitude is inversely related to an extent of deterioration of the area of the concrete structure corresponding to the data signals from which the determined amplitude was determined.

36. The system of claim 31, wherein the substantially concrete structure has a first side, and the means for determining the extent of deterioration of the one or more areas from the determined amplitudes includes:

means for determining, for each determined amplitude, a coordinate of the determined amplitude on a two-dimensional representation of the first side;

means for displaying the two-dimensional representation of the first side of the substantially concrete structure, wherein each determined amplitude is represented at the determined coordinate with a value corresponding to the determined amplitude; and means for determining the extent of deterioration of the one or more areas by visually inspecting the two-dimensional representation.

37. The system of claim 36, wherein each determined amplitude is represented in the two-dimensional representation as a color or grayscale value.

38. The system of claim 21, wherein the means for determining includes:

means for removing from each data signal data representing electromagnetic signals not reflected from the substantially concrete structure; and means for determining from remaining data of the data signals whether one or more areas of deterioration are present within the substantially concrete structure.

39. The system of claim 38, wherein at least a first side of the substantially concrete structure is adjacent to one or more layers of material, and the transmitted signal is transmitted through the one or more layers, and wherein the means for removing includes:
   means for removing, from each data signal, data representing electromagnetic signals reflected from the one or more layers.

40. The system of claim 21, further comprising:
   means for transmitting one or more of the electromagnetic signals into the concrete structure that result in the reflected electromagnetic energy.

41. A system for determining the condition of a substantially concrete structure, the system comprising:
   a computer-readable storage medium to store one or more computer-readable data signals, wherein each data signal represents an electromagnetic signal detected from the concrete structure and one or more of the detected electromagnetic signals include electromagnetic energy reflected from an area within the concrete structure as a result of an electromagnetic signal transmitted into the concrete structure;
   a data analysis application to receive the computer-readable data signals and determine from the data signals an extent of deterioration of one or more areas of the substantially concrete structure;
   means to read the one or more computer-readable data signals from the computer-readable medium; and
   means to execute the data analysis application.

42. The system of claim 41, wherein the data analysis application includes:
   a first selection module to receive as input the one or more data signals, select one or more of the one or more data signals, and output the selected signals; and
   an amplitude determination module to receive the selected signals, determine an amplitude of each selected data signal, and output the determined amplitudes,
   wherein the extent of deterioration of the one or more areas is determined from the determined amplitudes.

43. The system of claim 42, wherein the substantially concrete structure contains one or more reinforcing bars, and each selected data signal corresponds to one of the one or more reinforcing bar, and wherein the determined amplitude of each selected signal is an amplitude resulting from electromagnetic energy reflected from the corresponding reinforcing bar.

44. The system of claim 43, wherein the substantially concrete structure has a first side, each transmitted electromagnetic signal having been transmitted at a different position along the first side of the concrete structure, wherein each data signal represents an electromagnetic signal collected over a period of time, the data analysis module further including:
   a time interval selection module to receive the one or more data signals, to select, for each data signal, a time interval of the data signal during which the electromagnetic energy reflected from the corresponding reinforcing bar was detected, and to output the selected time intervals; and
   a peak amplitude determination module to receive the one or more data signals, to determine, for each data signal, a peak amplitude of the data signal during the selected time interval, and to output the peak amplitudes,
   wherein the first selection module selects, for one or more spatial intervals of a first length along the first side of the substantially concrete structure, a data signal with a peak amplitude of a highest magnitude from among data signals corresponding to electromagnetic signals transmitted within the spatial interval.

45. The system of claim 44, further comprising:
   a data migration module to receive the one or more data signals, to migrate the data signals, and to output the migrated signals to the first selection module, wherein the migration of the data signals facilitates the selecting of the data signal with a peak amplitude of the highest magnitude.

46. The system of claim 44, further comprising:
   a graphical user interface to receive the one or more data signals and display a representation of the one or more data signals as a function of time with respect to the first side of the concrete structure, to receive one or more first user-selected inputs, each first input indicative of a time interval, and to send each user-selected time interval to the first selection module,
   wherein the first selection module selects each selected time interval in accordance with one of the user-selected time interval.

47. The system of 46, wherein the graphical user interface receives one or more second user-selected inputs, each second input indicative of a spatial interval along the first side of the concrete structure, and sends each user-selected spatial interval to the first selection module,
   wherein the first selection module determines each spatial interval in accordance with one of the user-selected spatial intervals.

48. The system of claim 42, wherein the substantially concrete structure has a first side from which the transmitted and detected electromagnetic signals are transmitted and detected, respectively, and wherein the amplitude determination module includes:
   an adjustment module to receive the determined amplitudes, to adjust each determined amplitude to accommodate for attenuation of the selected signal from which the amplitude was determined due to a distance of the reinforcing bar corresponding to the selected signal from the first side, and output the adjusted amplitudes,
   wherein the extent of deterioration of the one or more areas is determined from the adjusted amplitudes.

49. The system of claim 42, wherein, for each determined amplitude, the determined amplitude is inversely related to an extent of deterioration of the area of the concrete structure corresponding to the data signal from which the determined amplitude was determined.

50. The system of claim 42, wherein the substantially concrete structure has a first side, and the data analysis application further includes:
   a coordinate determination module to receive the selected data signals, determine, for each determined amplitude, a coordinate of the determined amplitude on a two-dimensional representation of the first side, and output the determined coordinates,
   wherein the system further comprises a display device to receive the determined coordinates and display the two-dimensional representation of the first side of the substantially concrete structure, each determined amplitude represented at the determined coordinate with a value corresponding to the determined amplitude,
   wherein the extent of deterioration of the one or more areas is determined by visual inspection of the two-dimensional representation.

51. The system of claim 50, wherein each determined amplitude is represented in the two-dimensional representation as a color or grayscale value.

52. The system of claim 41, wherein the data signals include one or more first data signals corresponding to electromagnetic energy having an electric field polarized primarily in the first direction and one or more second data signals corresponding to electromagnetic energy having an electric field polarized primarily in the second direction substantially orthogonal to the first direction, wherein each first data signal has an associated second data signal detected from a same area as the first data signal, and wherein the data analysis application includes:

a subtraction module to receive the first and second data signals, to subtract, for each first data signal, the associated second data signal from the first data signal to produce a third signal, wherein the extent of deterioration of the one or more areas is determined from the third signal.

53. The system of claim 52, wherein the data analysis application further includes:

an amplitude determination module to receive the third signals, determine an amplitude of each third signal, and output the determined amplitudes, wherein the extent of deterioration of the one or more areas is determined from the determined amplitudes.

54. The system of claim 53, wherein the substantially concrete structure contains one or more reinforcing bars, and wherein the determined amplitude of each selected third signal is an amplitude resulting from electromagnetic energy reflected from one or more of the one or more reinforcing bars.

55. The system of claim 54, wherein the substantially concrete structure has a first side, each transmitted electromagnetic signal having been transmitted at a different position along the first side of the concrete structure, wherein each data signal represents an electromagnetic signal collected over a period of time, and wherein, for each third signal, data analysis module further includes:

a time interval selection module to receive the one or more data signals, to select, for each data signal, a time interval of the data signal during which the energy reflected from the one or more corresponding reinforcing bars was detected, and to output the selected time intervals; and a peak amplitude determination module to receive the one or more data signals, to determine, for each data signal, a peak amplitude of the data signal during the selected time interval, and to output the peak amplitudes, wherein the extent of deterioration of the one or more areas is determined from the peak amplitudes.

56. The system of claim 55, further comprising:

a graphical user interface to receive the one or more data signals and display a representation of the one or more data signals with respect to the first side of the concrete structure, each signal plotted as a function of time, to receive one or more first user-selected inputs, each first input indicative of a time interval, and to send each user-selected time interval to the first selection module, wherein the first selection module selects each selected time interval in accordance with one of the user-selected time interval.

57. The system of claim 53, wherein the substantially concrete structure has a first side from which the transmitted and detected electromagnetic signals are transmitted and detected, respectively, and wherein the substantially concrete structure contains one or more reinforcing bars, and wherein each determined amplitude corresponds to reflections of electromagnetic energy from one or more of the one or more reinforcing bars, wherein the amplitude determination module includes:

an adjustment module to receive the determined amplitudes, to adjust each determined amplitude to accommodate for attenuation of the selected signal from which the amplitude was determined due to a distance from the first side of the one or more reinforcing bar corresponding to the selected signal, and output the adjusted amplitudes, wherein the extent of deterioration of the one or more areas is determined from the adjusted amplitudes.

58. The system of claim 53, wherein, for each determined amplitude, the determined amplitude is inversely related to an extent of deterioration of the area of the concrete structure corresponding to the data signals from which the determined amplitude was determined.

59. The system of claim 53, the substantially concrete structure has a first side, and the data analysis application further includes:

a coordinate determination module to receive the third signals, determine, for each determined amplitude, a coordinate of the determined amplitude on a two-dimensional representation of the first side, and output the determined coordinates, wherein the system further includes a display device to receive the determined coordinates and display the two-dimensional representation of the first side of the substantially concrete structure, each determined amplitude represented at the determined coordinate with a value corresponding to the determined amplitude, and wherein the extent of deterioration of the one or more areas is determined by visual inspection of the two-dimensional representation.

60. The system of claim 59, wherein each determined amplitude is represented in the two-dimensional representation as a color or grayscale value.

61. The system of claim 41, wherein the data analysis application includes:

a data adjustment module to receive the one or more data signals, adjust each signal by removing from each data signal data representing electromagnetic signals not reflected from the substantially concrete structure, and output the adjusted signals, wherein the extent of deterioration at one or more areas within the substantially concrete structure is determined from the adjusted data signals.

62. The system of claim 61, wherein at least a first side of the substantially concrete structure is adjacent to one or more layers of material, and each transmitted signal is transmitted through the one or more layers, and wherein the data removed by the data adjustment module includes data representing electromagnetic signals reflected from the one or more layers.

63. The system of claim 41, further comprising:

an antenna unit to transmit one or more of the electromagnetic signals into the concrete structure that result in the reflected electromagnetic energy.

64. A method of determining the condition of at least a portion of a substantially concrete structure, the method comprising:

transmitting one or more electromagnetic signals into the substantially concrete structure;

for each transmitted signal, detecting a corresponding electromagnetic signal from the substantially concrete structure, the detected signal including electromagnetic energy reflected from the substantially concrete structure as a result of the transmitted signal; and determining from the detected electromagnetic signals an extent of deterioration of one or more areas within the substantially concrete structure.

65. The method of claim 64, wherein a plurality of the electromagnetic signals are transmitted contemporaneously from a plurality of locations.

66. The method of claim 64, wherein electromagnetic signals are transmitted sequentially from a plurality of locations.

\* \* \* \* \*